(12) United States Patent
Ghosh

(10) Patent No.: US 9,883,529 B2
(45) Date of Patent: Jan. 30, 2018

(54) CONTROLLING UPLINK TRANSMISSIONS IN COMMUNICATION SYSTEMS WITH SCHEDULED TRIGGER FRAMES

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 199 days.

(21) Appl. No.: 14/744,541

(22) Filed: Jun. 19, 2015

(65) Prior Publication Data

US 2016/0374070 A1 Dec. 22, 2016

(51) Int. Cl.
*H04W 72/04* (2009.01)
*H04W 74/06* (2009.01)

(52) U.S. Cl.
CPC .................................. *H04W 74/06* (2013.01)

(58) Field of Classification Search
CPC ......... H04W 72/0413; H04W 72/0446; H04W 52/248; H04L 5/0055
USPC ............... 370/329, 336, 311, 339, 338, 392; 455/522, 448
See application file for complete search history.

(56) References Cited

U.S. PATENT DOCUMENTS

| 2014/0071873 | A1* | 3/2014 | Wang ..................... H04W 74/08 370/311 |
| 2014/0161010 | A1* | 6/2014 | Merlin .............. H04W 52/0235 370/311 |
| 2016/0330755 | A1* | 11/2016 | Ding ................. H04W 52/0216 |
| 2016/0374112 | A1* | 12/2016 | Asterjadhi ........ H04W 74/0816 |

* cited by examiner

*Primary Examiner* — Charles C Jiang
*Assistant Examiner* — Wali Butt
(74) *Attorney, Agent, or Firm* — Hanley, Flight & Zimmerman, LLC

(57) ABSTRACT

Example methods disclosed herein for a station in a communication system include accessing a response frame received in response to a control frame transmitted to an access point. The response frame indicates a start time for a trigger frame to be transmitted by the access point to trigger the station to transmit an uplink transmission. Disclosed example methods also include controlling a receiver of the station to receive the trigger frame at the indicated start time. Example methods disclosed herein for an access point in a communication system include transmitting a response frame to a station in response to a control frame received from the station. The example response frame indicates a start time for a trigger frame to be transmitted by the access point to trigger the station to transmit an uplink transmission. Disclosed example methods also include transmitting the trigger frame at the indicated start time.

19 Claims, 11 Drawing Sheets

CONTROLLING UPLINK TRANSMISSIONS IN COMMUNICATION SYSTEMS WITH SCHEDULED TRIGGER FRAMES

FIELD OF THE DISCLOSURE

This disclosure relates generally to communication systems and, more particularly, controlling uplink transmissions in communication systems with scheduled trigger frames.

BACKGROUND

In some prior communication networks that are compliant with the Institute of Electrical and Electronics Engineers (IEEE) 802.11 standards, uplink transmissions by stations in the network are triggered by trigger frames transmitted by access points. However, the trigger frames in prior IEEE 802.11-compliant networks are typically unscheduled and, as such, their timing is unknown to the stations operating in the networks. When the trigger frames are unscheduled, a station may need to operate its receiver for extended periods of time to permit the receiver to opportunistically detect the transmission of an unscheduled trigger frame.

Figure 1:
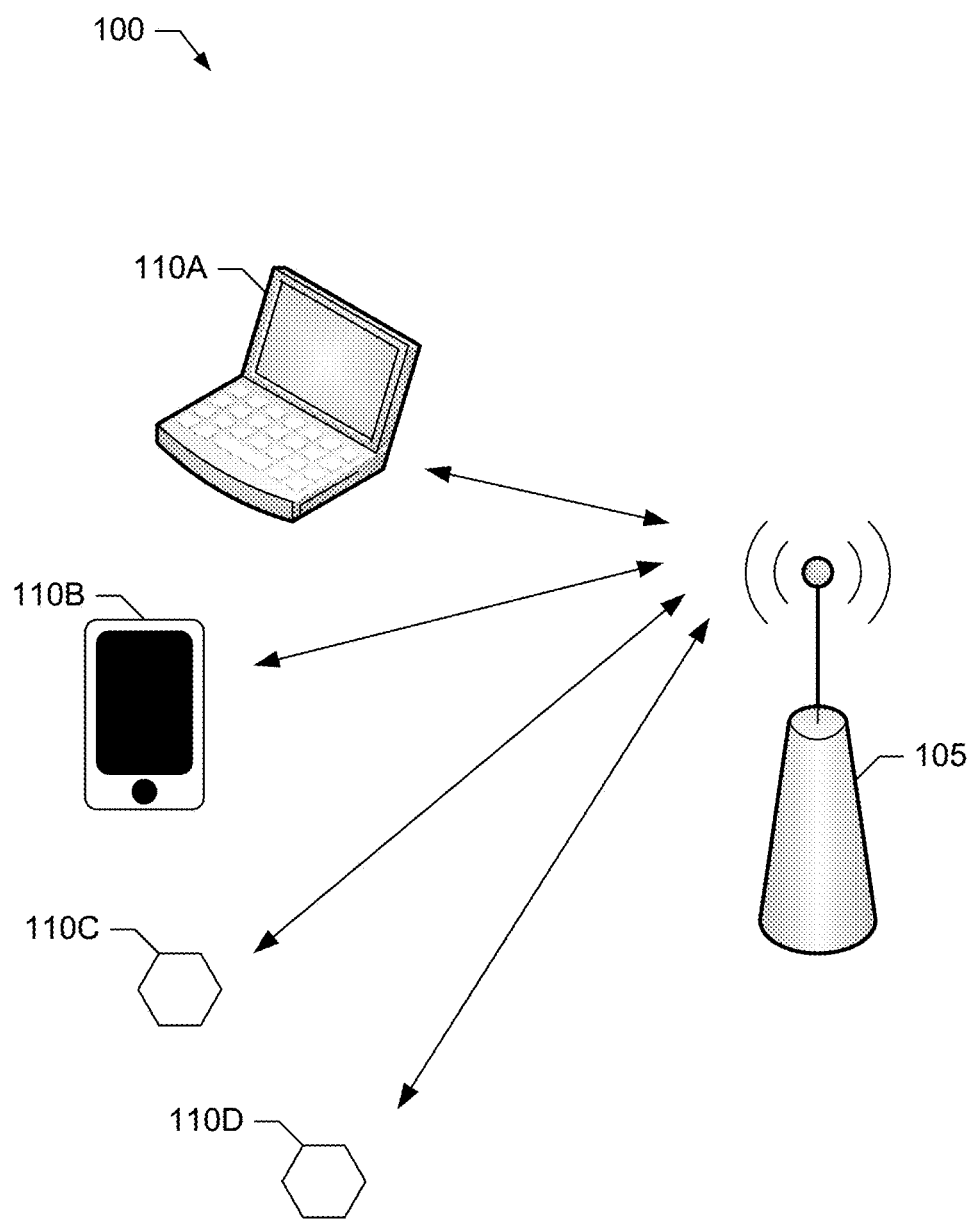
FIG. 1 is a block diagram of an example communication system in which uplink transmissions are controlled with scheduled trigger frames in accordance with the teachings of this disclosure.

The material disclosed herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, wherever possible, the same reference numbers will be used throughout the drawing(s) and accompanying written description to refer to the same or like parts, elements, etc.

DETAILED DESCRIPTION

Methods, apparatus, systems and articles of manufacture (e.g., physical storage media) to control uplink transmissions in communication systems with scheduled trigger frames are disclosed herein. Some example methods disclosed herein for a station (e.g., a mobile device, a stationary device, etc.) in a communication system include accessing an example response frame received in response to an example control frame transmitted to an access point (e.g., a router, a gateway, etc.) of the communication system for uplink resource allocation. The example response frame indicates a start time for an example trigger frame to be transmitted by the access point to trigger the station to transmit an uplink transmission. Some such disclosed example methods also include controlling a receiver of the station to receive the trigger frame at the start time indicated in the response frame.

In some such disclosed example methods, the communication system corresponds to an IEEE 802.11ax-compliant wireless local area network (WLAN), and the response frame is not a beacon frame transmitted by the access point.

Additionally or alternatively, in some such disclosed example methods, the control frame is a power save poll (PS-Poll) frame transmitted by the station to the access point, and the response frame is an acknowledgment (ACK) frame received by the station from the access point in response to the PS-poll frame.

Additionally or alternatively, some such disclosed example methods further include causing the station to enter a sleep mode for a first sleep interval beginning after receipt of the response frame and ending prior to the start time indicated in the response frame. In some such examples, controlling the receiver includes waking the receiver after expiration of the first sleep interval to permit the receiver to receive the trigger frame at the start time indicated in the response frame.

Additionally or alternatively, in some such disclosed example methods, controlling the receiver includes activating the receiver at the start time indicated in the response frame to receive the trigger frame. Some such disclosed example methods further include selecting an uplink resource specified in the trigger frame, and transmitting uplink data using the selected uplink resource. In some such disclosed example methods, the station is associated with a first association identifier (AID) assigned by the access point to the station, and selecting the uplink resource includes selecting a first uplink resource specified in the trigger frame as being associated with the first AID, when the trigger frame includes the first AID. Some such disclosed example methods also include selecting a second uplink resource from among a group of uplink resources specified in the trigger frame as being associated with a second AID (e.g., a generic AID, a group AID, etc.), when the trigger frame does not include the first AID.

Additionally or alternatively, in some such disclosed example methods, the station is a first station, the control frame is a first control frame, and the response frame is a multi-user block acknowledgment (MU-BA) frame responsive to the first control frame and a second control frame received by the access point from a second station during receipt of the first control frame from the first station. In some disclosed example methods, the MU-BA frame provides the start time for the trigger frame (e.g., the same trigger frame) to the first station and the second station. In some disclosed example methods, the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Some example methods disclosed herein for an access point (e.g., a router, a gateway, etc.) in a communication system include transmitting an example response frame to a station (e.g., a mobile device, a stationary device, etc.) in response to an example control frame for uplink resource allocation received from the station. The example response frame indicates a start time for an example trigger frame to be transmitted by the access point to trigger the station to transmit an uplink transmission. Some such disclosed example methods also include transmitting the trigger frame at the start time indicated in the response frame.

In some such disclosed example methods, the communication system corresponds to an IEEE 802.1 lax-compliant WLAN, and the response frame is not a beacon frame transmitted by the access point.

Additionally or alternatively, in some such disclosed example methods, the control frame is a PS-Poll frame received from the station, and the response frame is an ACK frame transmitted to the station in response to the PS-Poll frame.

Additionally or alternatively, in some such disclosed example methods, the trigger frame is a first trigger frame of a group of trigger frames scheduled by the access point based on a number of stations requesting allocation of uplink resources. Some such disclosed example methods further include assigning the station to the first trigger frame.

Additionally or alternatively, some such disclosed example methods further include, after transmitting the trigger frame, receiving uplink data from the station via an uplink resource specified in the trigger frame. In some disclosed example methods, the station is associated with a first AID assigned (e.g., by the access point) to the station, and the uplink resource is specified in the trigger frame as being associated with the first AID. In some disclosed example methods, the uplink resource is one of a group of uplink resources specified in the trigger frame as being associated with a second AID (e.g., a generic AID, a group AID, etc.), when the trigger frame does not include the first AID.

Additionally or alternatively, in some such disclosed example methods, the station is a first station, the control frame is a first control frame, and the response frame is an MU-BA frame responsive to the first control frame and a second control frame received by the access point from a second station during receipt of the first control frame from the first station. In some disclosed example methods, the MU-BA frame provides the start time for the trigger frame (e.g., the same trigger frame) to the first station and the second station. In some disclosed example methods, the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

These and other example methods, apparatus, systems and articles of manufacture (e.g., physical storage media) to control uplink transmissions in communication systems with scheduled trigger frames are disclosed in further detail below.

As noted above, some prior IEEE 802.11-compliant networks utilize unscheduled trigger frames to trigger uplink transmissions by stations to access points implementing the networks. To receive an unscheduled trigger frame, a station operating in such a prior network may need to operate its receiver for extended periods of time to permit the receiver to opportunistically detect the transmission of the unscheduled trigger frame. To reduce the operating time and, as such, the power consumption of station receivers in 802.11-compliant networks, one alternative would be to use trigger frames that are scheduled according to information broadcast in a beacon frame transmitted by the access point. However, such an approach would still involve the stations activating their receivers to detect the broadcast beacon frames, which may prevent the stations from achieving at least some very low power operating targets, such as targets associated with current and future Internet of Things (IoT) devices.

Controlling uplink transmissions in communication systems with scheduled trigger frames, as disclosed herein, provides technical solutions to such technical problems associated with receiver operation and power consumption in prior networks, such as prior IEEE 802.11-compliant networks. For example, when example stations operating in example communication systems supporting scheduled trigger frames as disclosed herein are ready to transmit uplink data, such example stations can learn the timing of trigger frames, which are to trigger when the example stations are to transmit their respective uplink data, through response frames provided to the stations in response to control frames transmitted by the stations. Thus, unlike prior stations operating in prior IEEE 802.11-compliant networks, such a disclosed example station can remain in a sleep or other low-power mode until just prior to when the station is ready to transmit uplink data. Then, when the disclosed example stations is ready to transmit its uplink data, the station transitions to an active mode, transmits a control frame for uplink resource allocation, and receives a response frame indicating the start time for the trigger frame that is to trigger when the disclosed example station is to transmit its uplink data.

As such, unlike prior stations operating in prior networks, example stations operating in example communication systems supporting scheduled trigger frames as disclosed herein need not operate their receivers to opportunistically detect transmission of unscheduled trigger frames. Moreover, such disclosed example stations may not even need to operate their receivers to detect beacon frames being transmitted by access points. Instead, as described above, and in further detail below, such disclosed example stations can achieve potentially substantial power savings by remaining in a sleep or other low-power mode until just prior to when the stations are ready to transmit uplink data, at which time the stations can wake and learn trigger frame timing through exchanges of control and response frames. Moreover, at least some such disclosed example stations can achieve further power savings by returning to a sleep or other low power mode for an interval (e.g., a sleep interval) between receipt of the response frame, which indicates the start time of the scheduled trigger frame to which the station is assigned, and the start time of the trigger frame.

Turning to the figures, a block diagram of an example communication system 100 in which uplink transmissions are controlled with scheduled trigger frames in accordance with the teachings of this disclosure is illustrated in FIG. 1. The example communication system 100 includes an example access point (AP) 105 in communication with example stations 110A, 110B, 110C and 110D. In the illustrated example of FIG. 1, the AP 105 implements a local area network (LAN), such as an IEEE 802.11 ax-compliant WLAN, via which the stations 110A-D may be in communication with each other, one or more other networks accessible via the AP 105, or any combination thereof. As such, the AP 105 may be implemented by, for example, one or more routers, gateways, bridges, etc., or any combination thereof.

As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, one or more of the example stations 110A-D may be implemented by any number and/or type(s) of mobile and/or stationary electronic devices, such as, but not limited to, one or more portable computer(s) (e.g., notebook computer(s), laptop computer(s), etc.), desktop computer(s), tablet(s), smartphone(s), mobile phone(s), etc. Additionally or alternatively, one or more of the example stations 110A-D may be implemented by any number and/or type(s) of Internet of Things (IoT) devices, such as one or more sensor(s), tag(s), implant(s), appliance(s), etc. For example, the station 110A is illustrated as corresponding to an example portable computer 110A (e.g., a notebook computer, a laptop computer, etc.) and the station 110B is illustrated as corresponding to an example smartphone 110B, whereas the stations 110C-D are illustrated as corresponding to example IoT devices 110C-D.

In the illustrated example communication system 100 of FIG. 1, one or more of the stations 110A-D may be more power constrained than others of the stations 110A-D. For example, the stations 110C-D may be low-power IoT devices having limited battery capacity but having target battery life spans of months, or even years. In contrast, the example stations 110A-B may not be as power constrained as the stations 110C-D because they have larger battery capacities and/or access to other power sources (e.g., grid power), have shorter target battery life spans (e.g., hours), etc.

To indicate when the stations 110A-D are permitted to transmit uplink data, and the uplink resources to be used by the stations 110A-D to transmit their respective uplink data, the AP 105 of the illustrated example transmits trigger frames. For example, the AP 105 transmits scheduled trigger frames, and indicates the start times of such scheduled trigger frames, to stations, such as the example stations 110C and/or 110D, in accordance with the teachings of this disclosure. For example, and as disclosed in further detail below, when the example station 110C is ready to transmit data, the station 110C wakes its transmitter and receiver (if it has been operating in a sleep or other low power mode) and transmits a control frame for uplink resource allocation to the AP 105. In response to receiving the control frame, the AP 105 assigns the station 110C to a scheduled trigger frame and replies to the control frame by sending a response frame indicating the start time of the scheduled trigger frame to the station 110C. The station 110C accesses the received response frame to obtain the start time of the scheduled trigger frame that is to trigger the station 110C to start its uplink transmission. In some examples, the station 110C further uses the start time to configure a sleep interval during which the station 110C transitions to a sleep or other low power mode (which may be the same or different from the sleep or other low power mode in which the station 110C operated prior to transmission of the control frame).

Thereafter, the station 110C controls its receiver (after waking its transmitter and receiver after expiration of the sleep interval, if appropriate) to receive the scheduled trigger frame at the start time indicated in the previously received response frame. Upon receiving the scheduled trigger frame, the station 110C then begins transmitting its uplink data using an uplink resource (e.g., a channel or sub-channel) selected from those specified in the scheduled trigger frame. After uplink data transmission is complete, the station 110C may then transition to a sleep or other low power mode until the station 110C is ready to transmit uplink data again.

In some examples, the AP 105 may also support transmission of unscheduled trigger frames, as in prior networks, to trigger uplink data transmission for stations, such as the example stations 110A and/or B, operating in the communication system 100. By supporting such unscheduled trigger frames, the AP 105 can be backward compatible with prior stations not supporting the use of scheduled trigger frames to control uplink transmissions in accordance with the teachings of this disclosure.

Although the example communication system 100 includes one (1) example AP 105 and four (4) example stations 110A-D, using scheduled trigger frames to control uplink transmissions as disclosed herein is not limited thereto. For example, the example communication system 100 can include more AP(s) 105 and/or more or fewer stations 110A-D. Furthermore, although the example AP 105 of the example communication system 100 is described as implementing an IEEE 802.11ax-compliant WLAN, controlling uplink transmissions with scheduled trigger frames as disclosed herein is not limited use in IEEE 802.11ax-compliant WLANs. On the contrary, example methods, apparatus, systems and articles of manufacture (e.g., physical storage media) to control uplink transmissions with scheduled trigger frames in accordance with the teachings of this disclosure can be used in any communication system employing trigger frames, or similar downlink transmissions, to trigger uplink transmissions by devices.

Figure 2:
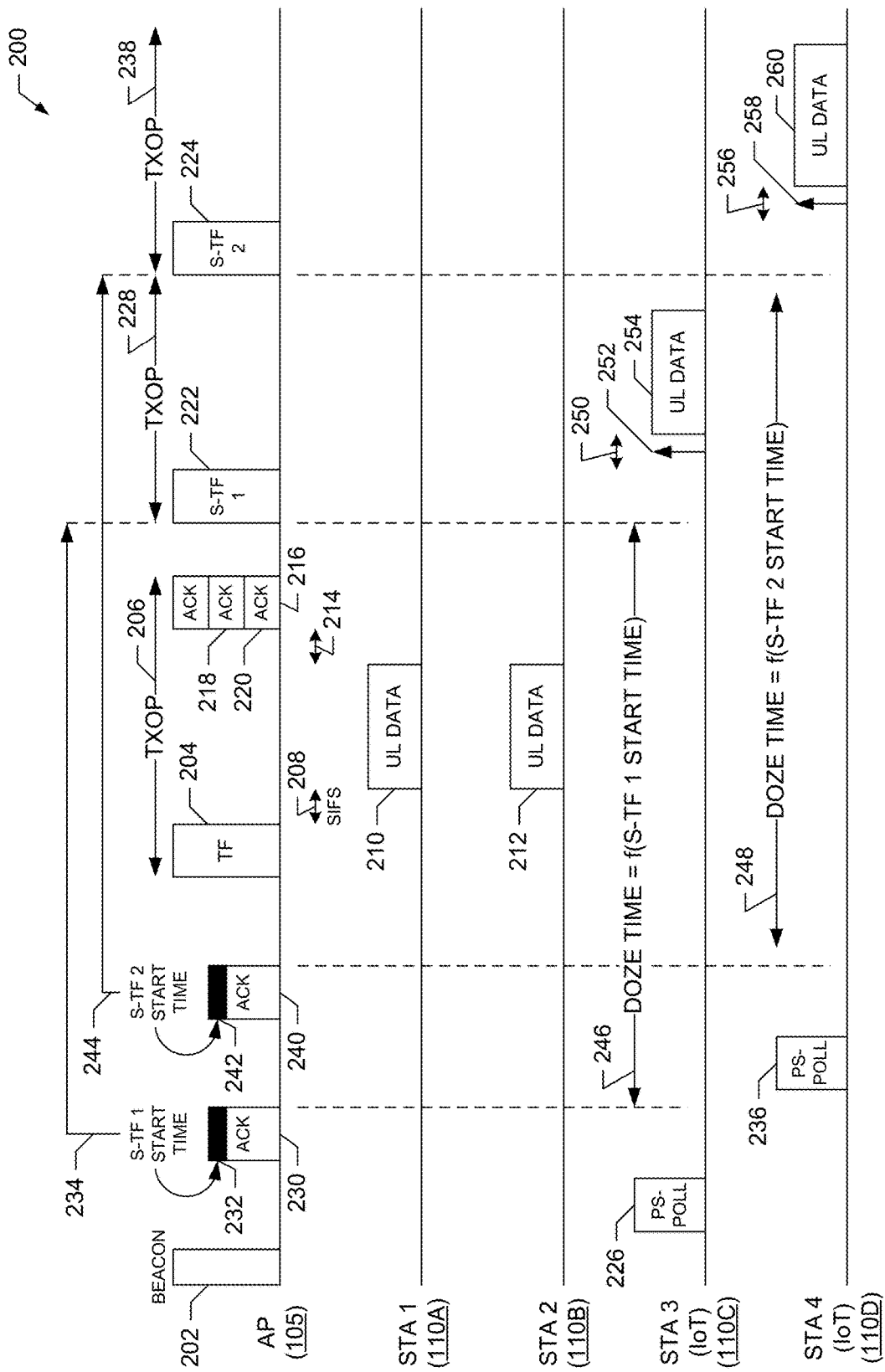
FIGS. 2-3 illustrate example timing diagrams of frame transmissions to control uplink transmissions with scheduled trigger frames in the example communication system of FIG. 1.

An example timing diagram 200 depicting example frame transmissions to control uplink transmissions with scheduled trigger frames in the example communication system 100 of FIG. 1 is illustrated in FIG. 2. In the example timing diagram 200 of FIG. 2, the example AP 105 of the communication system 100 transmits (e.g., periodically) an example beacon frame 202 containing information describing the WLAN implemented by the AP 105. The example devices 110A-D of the communication system 100 use the information broadcast in the beacon frame 202 to become associated with the AP 105 and, thus, join the WLAN implemented by the AP 105.

In the example timing diagram 200 of FIG. 2, the AP 105 supports use of unscheduled trigger frames, such as an example unscheduled trigger frame (TF) 204, for triggering when stations, such as the example stations 110A and 110B, are to transmit uplink data. (In FIG. 2, the stations 110A and 110B are also labeled as STA 1 and STA 2, respectively.) In prior 802.11-compliant systems not employing trigger frames, such as prior systems employing a carrier sense multiple access-collision avoidance (CSMA-CA) protocol, stations contended for the uplink transmission medium using a contention time window (CW) chosen from, for example, 0 to 31 to permit access to an entire uplink channel of, for example, 20 megahertz (MHz) or 40 MHz. However, later systems employing orthogonal frequency division multiple access (OFDMA) divided the entire uplink channels into sub-channels (e.g., 2.5 MHz sub-channels) to be allocated as possible uplink resources to be used for transmitting uplink data. These systems also introduced unscheduled trigger frames to allocate different uplink resources (e.g., different uplink sub-channels) to different stations and to trigger when the stations are permitted to transmit on their respective allocated uplink resources.

For example, prior unscheduled trigger frames, such as the example unscheduled TF 204, include station identifiers (IDs), such as association IDs (AIDs), for each station assigned an uplink resource during the transmission window defined by the trigger frame, and specify the uplink resources (e.g., uplink sub-channels) and durations of access assigned to the respective AIDs. However, the size of such a centralized scheduling message can grow substantially as the number of stations and the number of uplink resource allocations per station increases in the network. Furthermore, as noted above, the timing of the example TF 204 is unscheduled relative to the stations 110A and 110B. Thus, the stations 110A and 110B may need to activate their respective receivers for substantial periods of time to opportunistically detect the transmission of the unscheduled TF 204.

In the illustrated example timing diagram 200 of FIG. 2, the unscheduled TF 204 transmitted by the AP 205 defines an example transmission opportunity (TXOP) window 206 during which the stations 110A and 110B are able to transmit their respective uplink data, if any. The TF 204 further includes an AID for station 110A and specifies an uplink resource assigned to the AID for station 110A. The TF 204 similarly includes an AID for station 110B and specifies an uplink resource assigned to the AID for station 110B. After an example short interframe sensing (SIFS) period 208, which permits stations, such as the stations 110A-B, to transition from receive mode to transmit mode, and vice versa, the station 110A transmits example uplink (UL) data 210 using its assigned uplink resource (e.g., sub-channel) and the station 110B transmits example uplink (UL) data 212 using its assigned uplink resource (e.g., sub-channel).

In the example timing diagram 200 of FIG. 2, the AP 105 supports multi-user (MU) uplink transmissions in which multiple stations, such as the stations 110A and 110B, can transmit their respective uplink transmissions, such as the uplink data transmission 210 and 212, for receipt by the AP 105 at substantially the same time. Thus, after another example SIFS interval 214, the AP 105 of the illustrated example transmits an example MU block acknowledgment (BA) frame 216 for receipt by the stations 110A and 110B. Through use of the MU-BA frame 216, the AP 105 is able to send an example acknowledgment (ACK) message 218 to the station 110A for the uplink data 210 and an example ACK message 220 to the station 110B in the same MU-BA frame 216.

To reduce the size and complexity of trigger frames used in the example communication system 100, the AP 105 also supports the scheduled transmission of trigger frames, which may include example short trigger frames (S-TFs) disclosed herein, and/or trigger frames having format(s) similar to prior trigger frames. For example, the communication system 100 supports the scheduled transmission of the example S-TFs 222 and 224 illustrated in the example timing diagram 200, in addition or as an alternative to transmission of the example TF 204. The example S-TFs 222 and 224 (also labeled as S-TF 1 and S-TF 2 in FIG. 2) are referred to as "short" TFs because, in some examples, the amount of data conveyed by the S-TFs 222 and 224 is less than the amount of data conveyed by, for example, the TF 204. This because the AP 105 may replace one unscheduled TF, such as the TF 204, with multiple scheduled S-TFs, such as the S-TFs 222 and 224, with fewer stations being associated with a given one of the S-TFs 222 and 224. Because the S-TFs 222 and 224 may be associated with smaller numbers of stations than the TF 204, the sizes of the S-TFs 222 and 224 may be smaller than the size of the TF 204.

Furthermore, in some examples, for stations associated with a given S-TF, such as the S-TF 222, the AP 105 does not assign individual uplink resources to some or all of those stations. Instead, the AP 105 allocates a group of resources to some or all of the stations associated with the given S-TF, from which the stations then randomly select their respective uplink resources from the allocated group. In this way, the AP 105 need not include in a given S-TF the AIDs and specified uplink resources for all of the stations associated with the S-TF but, instead, can associate a group of uplink resources with a generic ID, or group ID. In some examples, if a given station associated with a given S-TF does not detect its AID in the S-TF, the given station then randomly selects an uplink resource from the group of resources specified in the S-TF as being associated with the generic ID, or group ID, and then transmits its uplink data using the selected resource.

In addition to supporting transmission of multiple S-TFs, such as the example S-TFs 222 and 224, the example AP 105 also supports scheduling of the S-TFs, such as the S-TFs 222 and 224, in accordance with the teachings of this disclosure. In some examples, the AP 105 utilizes unscheduled TFs, such as the TF 204, to trigger when active stations and/or stations that are not power constrained, such as the stations 110A and 110B, are to transmit uplink data, and utilizes scheduled S-TFs, such as the S-TFs 222 and 224, to trigger when IoT devices and other power constrained stations, such as the stations 110C and 110D, are to transmit uplink data. However, in other examples, the AP 105 may also utilize scheduled S-TFs, such as the S-TFs 222 and 224, to trigger when active stations and/or stations that are not power constrained, such as the stations 110A and 110B, are to transmit uplink data. Moreover, in some examples, the AP 105 may utilize S-TFs, such as the S-TFs 222 and 224, exclusively and not transmit unscheduled TFs, such as the TF 204, to trigger when stations are to transmit uplink data.

In the example timing diagram 200 of FIG. 2, scheduled trigger frames (e.g., S-TFs 222, 224) are used to control uplink transmissions by the example stations 110C and 110D as follows. Initially, the stations 110C and 110D operate in a sleep mode (e.g., a deep sleep mode) or other low-power operating mode until the stations are ready to transmit uplink data. When the station 110C is ready to transmit uplink data, the station 110C wakes, activates its transmitter and receiver, and sends an example control frame 226 for uplink resource allocation, such as an example power save (PS) poll frame 226, to the AP 105. In response to the control frame 226, the AP 105 assigns the station 110C to a scheduled S-TF, such as the example S-TF 222, and allocates uplink resource(s) for use by the station 110C during an example TXOP window 228 defined by the S-TF 222. Additionally, the AP 105 responds to the control frame 226 with an example ACK frame 230, which includes an example start time field 232 indicating a start time 234 of the S-TF 222 to which the AP 105 assigned the station 110C.

Similarly, when the station 110D is ready to transmit uplink data, the station 110D wakes, activates its transmitter and receiver, and sends an example control frame 236 for uplink resource allocation, such as an example PS-poll frame 236, to the AP 105. In response to the control frame 236, the AP 105 assigns the station 110D to a scheduled S-TF, such as the example S-TF 224, and allocates uplink resource(s) for use by the station 110D during an example TXOP window 238 defined by the S-TF 224. Additionally, the AP 105 responds to the control frame 236 with an example ACK frame 240, which includes an example start time field 242 indicating a start time 244 of the S-TF 224 to which the AP 105 assigned the station 110D.

In the illustrated example timing diagram 200 of FIG. 2, the AP 105 assigned the stations 110C and 110D to different scheduled S-TFs, namely, the S-TFs 222 and 224, respectively. However, in other examples, the AP 105 could assign the stations 110C and 110D to the same scheduled S-TF, such as either one of the S-TFs 222 or 224. As described in further detail below, the number of scheduled S-TFs allocated by the AP 105, and the assignment of stations to scheduled S-TFs, may be based on a number of stations requesting allocation of resources (e.g., via control frames, such as PS-Poll frames) during a given time interval.

In the illustrated example timing diagram 200 of FIG. 2, after receiving the ACK frame 230, the station 110C configures an example sleep interval 246 (also referred to herein as a doze interval) during which the station 110C transitions to a sleep mode (e.g., a shallow sleep mode) or other lower power operating mode while waiting for the start time 234 of the S-TF 222, which was indicated in the start time field 232 of the ACK frame 230. The sleep mode or other lower power operating mode used by the station 110C during the sleep interval 246 may be the same as, or different from, the sleep mode or other lower power operating mode used by the station 110C prior to transmission of the control frame 226. As illustrated in the example of FIG. 2, the station 110C configures the sleep interval 246 to have a duration that is a function of the start time 234 of the S-TF 222, which was indicated in the start time field 232 of the ACK frame 230. For example, the function used by the station 110C to configure the sleep interval 246 may specify that the sleep interval 246 is not to exceed a maximum time that is the difference between the start time 234 of the S-TF 222 and the time at which the ACK frame 230 was received. In some examples, the function used by the station 110C to configure the sleep interval 246 may further reduce this maximum time by an amount of time needed by the station 110C to transition from, for example, the shallow sleep mode or other low-power operating mode and an active mode during which the station 110C is able to at least receive the S-TF 222.

Similarly, in the illustrated example timing diagram 200 of FIG. 2, after receiving the ACK frame 240, the station 110D configures an example sleep interval 248 (also referred to herein as a doze interval) during which the station 110D transitions to a sleep mode (e.g., a shallow sleep mode) or other lower power operating mode while waiting for the start time 244 of the S-TF 224, which was indicated in the start time field 242 of the ACK frame 240. The sleep mode or other lower power operating mode used by the station 110D during the sleep interval 248 may be the same as, or different from, the sleep mode or other lower power operating mode used by the station 110D prior to transmission of the control frame 236. As illustrated in the example of FIG. 2, the station 110D configures the sleep interval 248 to have a duration that is a function of the start time 244 of the S-TF 224, which was indicated in the start time field 242 of the ACK frame 240. For example, the function used by the station 110D to configure the sleep interval 248 may specify that the sleep interval 248 is not to exceed a maximum time that is the difference between the start time 244 of the S-TF 224 and the time at which the ACK frame 240 was received. In some examples, the function used by the station 110D to configure the sleep interval 248 may further reduce this maximum time by an amount of time needed by the station 110D to transition from, for example, the shallow sleep mode or other low-power operating mode and an active mode during which the station 110D is able to at least receive the S-TF 224.

In the illustrated example timing diagram 200 of FIG. 2, after expiration of the sleep interval 246, the station 110C activates its receiver such that the station 110C is ready to receive the S-TF 222 at the start time 234 indicated in the start time field 232 of the ACK frame 230. After receiving the S-TF 222, and while the station 110C transitions from receive mode to transmit mode during another example SIFS interval 250, the station 110C accesses the S-TF 222 and selects (indicated by an arrow 252 in FIG. 2) an uplink resource (e.g., an uplink sub-channel) to use to transmit its uplink data to the AP 105. For example, if the station 110C detects its AID (e.g., which was previously assigned by the AP 105 to the station 110C when the station 110C was associated with the AP 105 via an IEEE 802.11-compliant association procedure) in the S-TF 222, the station 110C selects the uplink resource(s) assigned to its AID in the S-TF 222. However, if the station 110C does not detect its AID in the S-TF 222, in some examples, the station 110C selects (e.g., via a random selection procedure) an uplink resource (or set of resources) from a group of available uplink resources assigned to a group ID, a generic ID, etc., in the S-TF 222, or otherwise listed as default uplink resources in the S-TF 222. After selecting the uplink resource(s) based on the information provided in the S-TF 222, and the SIFS interval 250 has expired, the station 110C transmits example uplink (UL) data 254 to the AP 105. Once transmission of the uplink data 254 completes, the station 110C transitions to a sleep mode (e.g., a deep sleep mode) or other low-power operating mode until, for example, the station 110C is again ready to transmit uplink data to the AP 105.

Similarly, in the illustrated example timing diagram 200 of FIG. 2, after expiration of the sleep interval 248, the station 110D activates its receiver such that the station 110D is ready to receive the S-TF 224 at the start time 244 indicated in the start time field 242 of the ACK frame 240. After receiving the S-TF 224, and while the station 110D transitions from receive mode to transmit mode during another example SIFS interval 256, the station 110D accesses the S-TF 224 and selects (indicated by an arrow 258 in FIG. 2) an uplink resource (e.g., an uplink sub-channel) to use to transmit its uplink data to the AP 105. For example, if the station 110D detects its AID (e.g., which was previously assigned by the AP 105 to the station 110D when the station 110D was associated with the AP 105 via an IEEE 802.11-compliant association procedure) in the S-TF 224, the station 110D selects the uplink resource(s) assigned to its AID in the S-TF 224. However, if the station 110D does not detect its AID in the S-TF 224, in some examples, the station 110D selects (e.g., via a random selection procedure) an uplink resource (or set of resources) from a group of available uplink resources assigned to a group ID, a generic ID, etc., in the S-TF 224, or otherwise listed as default uplink resources in the S-TF 224. After selecting the uplink resource(s) based on the information provided in the S-TF 224, and the SIFS interval 256 has expired, the station 110D transmits example uplink (UL) data 260 to the AP 105. Once transmission of the uplink data 260 completes, the station 110D transitions to a sleep mode (e.g., a deep sleep mode) or other low-power operating mode until, for example, the station 110D is again ready to transmit uplink data to the AP 105 and/or is to perform one or more other operations.

Figure 3:
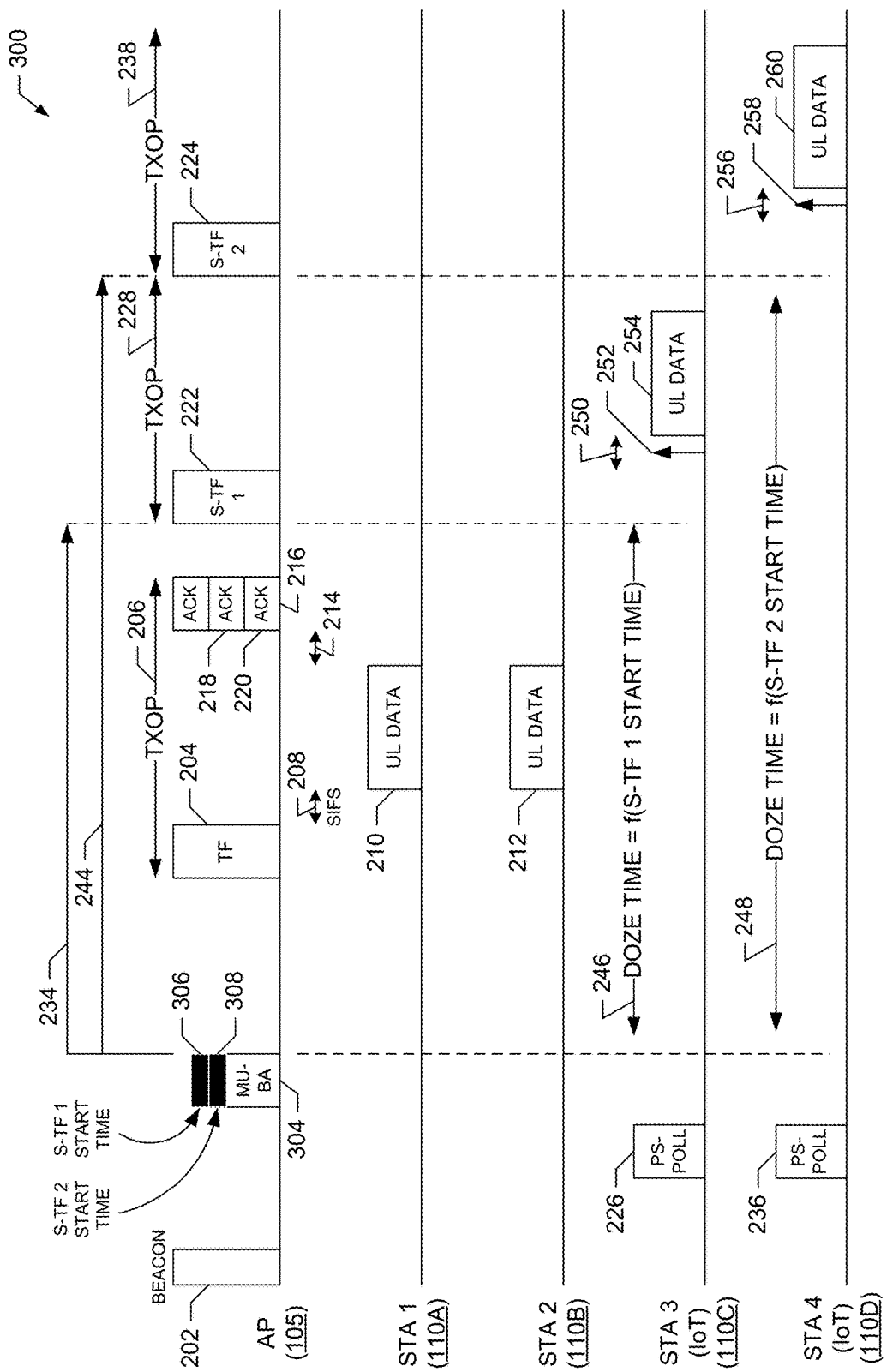

An example timing diagram 300 depicting another example of frame transmissions to control uplink transmissions with scheduled trigger frames in the example communication system 100 of FIG. 1 is illustrated in FIG. 3. The example timing diagram 300 depicts many example frames and other elements that are the same as, or similar to, corresponding example frames and other elements included in the example timing diagram 200 of FIG. 2. Such like frames and other elements are labeled with the same reference numerals in FIGS. 2 and 3. These like frames and other elements are described in detail above in connection with the description of the example timing diagram 200 of FIG. 2 and, in the interest of brevity, are not described again in the description of the example timing diagram 300 of FIG. 3.

Turning to FIG. 3, the primary difference between the example timing diagram 300 illustrated therein and the example timing diagram 200 of FIG. 2 is that, in the example timing diagram 300, the AP 105 supports MU uplink transmissions in which the AP 105 can receive multiple uplink control frames, such as the control (e.g., PS-Poll) frames 226 and 236, from multiple users, such as the stations 110C and 110D, at substantially the same time. In some such examples, when the AP 105 receives control frames for uplink resource allocation from multiple stations at substantially the same time, the AP 105 responds to the multiple control frames with a MU-BA frame, rather than using separate ACK frames to respond to the multiple, different control frames.

For example, in the timing diagram 300 of FIG. 3, the AP 105 receives the example control frame 226 (e.g., the example PS-Poll frame 226) from the station 110C and the example control frame 236 (e.g., the example PS-Poll frame 236) from the station 110D at substantially the same time (e.g., such as when the stations 110C and 110D are two IoT stations in the system 100 employing the same sleep/wake cycle times). As described above, the stations 110C and 110D transmit their respective control frames 226 and 236 to the AP 105 to request allocation of uplink resources for uplink data transmission. As described above, in response to the control frame 226, the AP 105 assigns the station 110C to the example S-TF 222 and allocates uplink resource(s) for use by the station 110C during the example TXOP window 228 defined by the S-TF 222. Similarly, in response to the control frame 236, the AP 105 assigns the station 110D to the example S-TF 224 and allocates uplink resource(s) for use by the station 110D during the example TXOP window 238 defined by the S-TF 224. As noted above, although the AP 105 assigned the stations 110C and 110D to different scheduled S-TFs, namely, the S-TFs 222 and 224, in the illustrated example of FIG. 3, in other examples, the AP 105 could assign the stations 110C and 110D to the same scheduled S-TF, such as either one of the S-TFs 222 or 224, with the number of scheduled S-TFs allocated by the AP 105, and the assignment of stations to scheduled S-TFs, being based on a number of stations requesting allocation of resources (e.g., via control frames, such as PS-Poll frames) during a given time interval.

In the illustrated example timing diagram 300 of FIG. 3, after assigning the stations 110C and 110D to the respective S-TFs 222 and 224, the AP 105 responds to the control frames 226 and 236 with an example MU-BA frame 304 to acknowledge both of the control frames 226 and 236. The MU-BA frame 304 of the illustrated example includes a first example start time field 306 indicating the start time 234 of the S-TF 222 to which the AP 105 assigned the station 110C, and a second example start time field 308 indicating the start time 244 of the S-TF 224 to which the AP 105 assigned the station 110D. In some examples, the MU-BA frame 304 includes an identifier, such as an AID for the station 110C and/or an identifier based on a frame/message identifier included in the control frame 226, to associate the start time field 306 with the station 110C, thereby providing the start time 234 of the S-TF 222 to the station 110C. Similarly, in some examples, the MU-BA frame 304 includes an identifier, such as an AID for the station 110D and/or an identifier based on a frame/message identifier included in the control frame 236, to associate the start time field 308 with the station 110D, thereby providing the start time 244 of the S-TF 224 to the station 110D. In some examples, the MU-BA frame 304 may include more start time fields for use by other stations if, for example, control frames (e.g., PS-poll frames) were also received from such other stations at substantially the same time as the control frames 226 and 236. The remainder of the example timing diagram 300 then proceeds as in the example timing diagram 200 of FIG. 2.

As shown in the example timing diagrams 200 and 300 of FIGS. 2 and 3, the AP 105 may schedule multiple S-TFs (e.g., the S-TFs 222 and 224) and assign different IoT stations (STAs) (and/or other type(s) of STAs) to any of them. The start time for the S-TF assigned to a given STA (e.g., IoT STA) is indicated in the response frame (e.g., the ACK frame 230 or 240, the MU-MA frame 304, etc.) sent by the AP 105 to the given STA. This start time indication permits IoT STAs (and/or other type(s) of STAs) to skip monitoring (e.g., listening) for unscheduled trigger frames (e.g., the TF 204). Accordingly, the example timing diagrams 200 and 300 of FIGS. 2 and 3 demonstrate that controlling uplink transmissions with scheduled trigger frames (e.g., scheduled S-TFs) in accordance with the teachings of this disclosure can, for example, (i) increase sleep (doze) time due to reducing the active receiving (listening) time required for a station to detect its assigned, or the next, trigger frame; (ii) provide an AP with the ability to restrict the number of IoT STAs (and/or other type(s) of STAs) assigned per scheduled trigger frame; and (iii) reduce contention among IoT STAs (and/or other type(s) of STAs) by assigning the STAs to multiple scheduled trigger frames (e.g., scheduled S-TFs).

In summary, the example timing diagrams 200 and 300 of FIGS. 2 and 3 illustrated the following example frame exchanges and other example operations that can result in reduced power consumption and increased sleep (e.g., doze) time for STAs (e.g., IoT STAs) operating in a system, such as the example communication system 100 of FIG. 1.

(1) The AP may schedule multiple scheduled trigger frames (e.g., S-TFs) to cater to a number (e.g., a significant number) of IoT STAs.

(2) An IoT STA, after waking up, may transmit a short control action frame, such as a PS-Poll frame, to request the AP to allocate resources and also indicate to the AP that the IoT STA is awake.

(3) The AP sends a response frame, such as an ACK frame, to the STA with an indication of the start time to an assigned S-TF. The assignment is controlled by an AP based on a number of IoT STAs (and/or other type(s) of STAs) requesting resources.

(4) On receiving the start time indication, the STA returns to a sleep mode (e.g., doze mode) until the indicated start time. The sleep (doze) times of different STAs may be different based on assignments of the STAs to their specific S-TFs, as depicted for STA 3 and STA 4 in the example timing diagrams 200 and 300.

(5) The STA receives the S-TF and, in some examples, randomly selects a sub-channel to transmit its UL data. The AP may also schedule resources or sub-channels for STAs that have been assigned to a specific S-TF based on received requests from STAs (e.g., IoT STAs and/or other STAs) in the network. Furthermore, based on the number of PS-Polls received by the AP, the AP can decide on whether to assign all requesting STAs in one S-TF, or to assign the STAs in separate S-TFs. As such, the AP also determines the number of S-TFs to be scheduled to cater to all of the requesting STAs (e.g., the requesting IoT STAs and/or other type(s) of STAs).

(6) Although the example timing diagram 200 of FIG. 2 depicts that the PS-Polls from different STAs (e.g., the STAs 3 and 4) are transmitted in a sequence, the example timing diagram 300 of FIG. 3 depicts that the PS-Polls from different STAs (e.g., the STAs 3 and 4) may also be transmitted in an MU format when the wake times for a group of IoT STAs (and/or other type(s) of STAs) are identical (or similar). In such a case, the AP may send an MU-BA frame (e.g., such as the MU-BA frame 304) to all of these STAs. The MU-BA frame indicates the start time(s) to either the same S-TF (e.g., if all of the requesting STAs are assigned to the same S-TF) or to different S-TFs (e.g., if some or all of the requesting STAs are assigned to different S-TFs).

Figure 4:
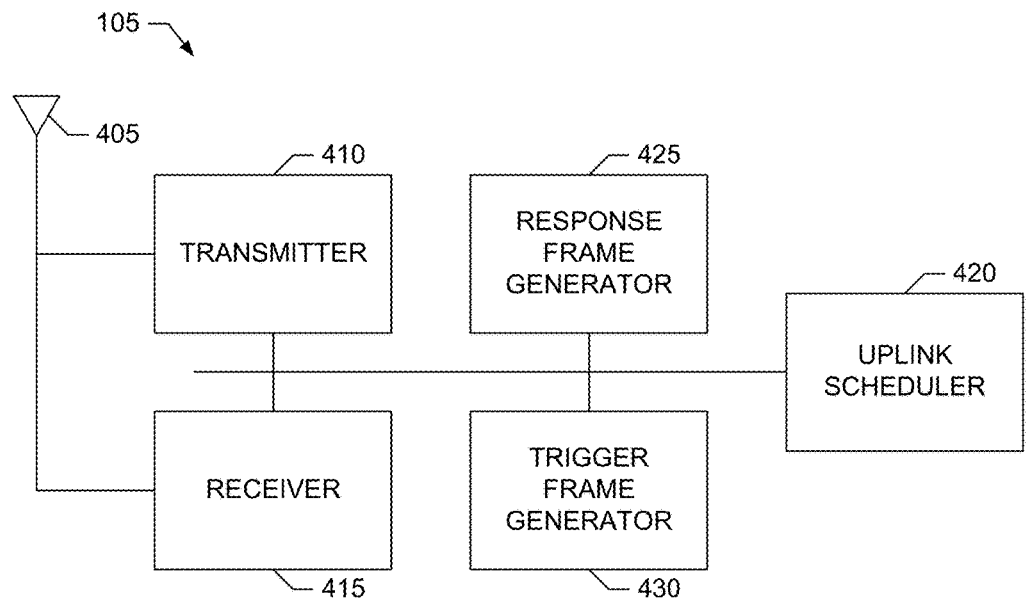
FIG. 4 is a block diagram of an example access point that may be used to implement the example communication system of FIG. 1.

A block diagram of an example implementation of the AP 105 of FIG. 1 is illustrated in FIG. 4. FIG. 4 illustrates structures used to control uplink transmissions with scheduled trigger frames in accordance with the teachings of this disclosure. Other structures of the AP 105 directed to implementing other AP functionality not associated with controlling uplink transmissions with scheduled trigger frames are omitted for clarity.

The example AP 105 of FIG. 4 includes one or more example antennas 405 in communication with an example transmitter 410 and an example receiver 415 to transmit and receive, respectively, signals in the example communication system 100. For example, the transmitter 410 and the receiver 415 can be implemented by one or more transceivers and/or transceiver circuits conforming to one or more communication protocols, such as an IEEE 802.11ax-compliant transceiver. The example antenna(s) 405 can be implemented by one or more antennas (e.g., wire antenna(s), patch antenna(s), etc.) structured to emit and receive signals conforming to the communication protocol(s) supported by the transmitter 410 and the receiver 415, such as one or more IEEE 802.11 ax-compliant antennas.

The example AP 105 of FIG. 4 also includes an example uplink scheduler 420 to receive control frames, such as the example PS-Poll frames 226 and/or 236, from stations, such as the stations 110C and/or 110D, to request allocation of uplink resources for transmitting uplink data. In response to receiving such control frames, the example uplink scheduler 420 schedules, as described above, one or more trigger frames, such as the S-TFs 222 and/or 224, and assigns the stations requesting uplink resources to the one or more scheduled trigger frames. As described above, in some examples, the uplink scheduler 420 determines the number of scheduled trigger frames (e.g., the number of S-TFs) based on the number of control frames (e.g., PS-Poll frames) received from stations during a given period of time (e.g., such as during a given uplink scheduling window).

In the illustrated example, for a given scheduled trigger frame (e.g., S-TF), the uplink scheduler 420 also allocates uplink resources (e.g., sub-channels) to the respective stations assigned to the given scheduled trigger frame. In some examples, the uplink scheduler 420 assigns specific uplink resource(s) to a specific requesting station. Additionally or alternatively, in some examples, the uplink scheduler 420 assigns a group of uplink resources to a group of requesting stations, with each station in the group being expected to select (e.g., randomly) its uplink resource(s) from the group of uplink resources.

The example AP 105 of FIG. 4 further includes an example response frame generator 425 to generate response frames, such as the example ACK frames 230 and/or 240, and/or the example MU-BA frame 304, to be sent to station(s), such as the stations 110C and/or 110D, from which control frames, such as the example PS-Poll frames 226 and/or 236, for uplink resource allocation were received. The response frame generated by the example response frame generator 425 for receipt by a given station indicates the start time of the scheduled trigger frame (e.g., the scheduled S-TF) to which the station was assigned by the uplink scheduler 420. For example, if the response frame is an individual ACK frame (e.g., such as the ACK frame 230) being sent to an individual station (e.g., the station 110C) in response to an individual control frame (e.g., the PS-Poll frame 226), then the response frame indicates the start time (e.g., the start time 234) of the scheduled trigger frame (e.g., the S-TF 222) to which the station is assigned. As another example, if the response frame is an MU-BA frame (e.g., the MU-BA frame 304) being sent to multiple stations (e.g., the stations 110C and 110D) in response to multiple control frames (e.g., the PS-Poll frames 226 and 236) received at the same time, then the response frame indicates the start time(s) (e.g., the start times 234 and/or 244) of the scheduled trigger frames (e.g., the S-TFs 222 and/or 224) to which the multiple stations are assigned. As described above, the AP may assign the multiple stations to the same S-TFs or to multiple S-TFs.

The example AP 105 of FIG. 4 includes an example trigger frame generator 430 to generate scheduled trigger frames, such as the scheduled S-TFs 222 and 224, for transmission at their scheduled start times. In the illustrated example of FIG. 4, the scheduled trigger frames generated by the trigger frame generator 430 specify the uplink resource(s) allocated to the station(s) assigned to the respective scheduled trigger frames. For example, if the uplink scheduler 420 allocated specific resource(s) to a particular station assigned to a given scheduled trigger frame, then the trigger frame generator 430 may generate the given scheduled trigger frame to specify the specific resource(s) allocated to the particular station. In some examples, the trigger frame generator 430 may also include an identifier (e.g., an AID) for that particular station in the scheduled trigger frame, and associate the identifier with the specific resource(s) allocated to that station. As another example, if the uplink scheduler 420 allocated a group of uplink resources to a group of stations assigned to a given scheduled trigger frame, then the trigger frame generator 430 may generate the given scheduled trigger frame to specify the group of uplink resources allocated to the group of stations. In some examples, the trigger frame generator 430 may also include an identifier for that the group of stations (e.g., such as a group ID, a generic ID, a default ID, etc.) in the scheduled trigger frame, and associate the identifier with the group of uplink resources allocated to the group of stations.

Figure 5:
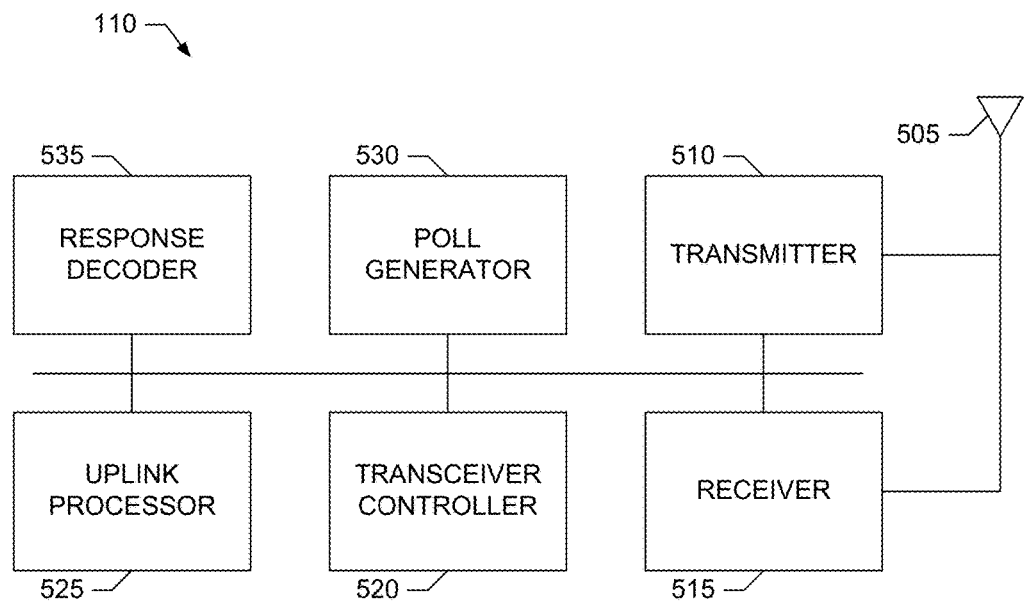
FIG. 5 is a block diagram of an example station that may be used to implement the example communication system of FIG. 1.

A block diagram of an example implementation of an example station 110, which may be used to implement one or more of the example stations 110A-D of FIG. 1, is illustrated in FIG. 5. FIG. 5 illustrates structures used to control uplink transmissions with scheduled trigger frames in accordance with the teachings of this disclosure. Other structures of the station 110 directed to implementing other station functionality not associated with controlling uplink transmissions with scheduled trigger frames are omitted for clarity.

The example station 110 of FIG. 5 includes one or more example antennas 505 in communication with an example transmitter 510 and an example receiver 515 to transmit and receive, respectively, signals in the example communication system 100. For example, the transmitter 510 and the receiver 515 can be implemented by one or more transceivers and/or transceiver circuits conforming to one or more communication protocols, such as an IEEE 802.11 ax-compliant transceiver. As such, the example transmitter 510 and the example receiver 515 may include one or more modulators and/or demodulators, such as an orthogonal frequency division multiplexing (OFDM) modulator/demodulator, a Wi-Fi modulator/demodulator, etc., to modulate signals for transmission and/or to demodulate received signals. Additionally, the example transmitter 510 and the example receiver 515 may include one or more filters, amplifiers, etc., to, for example, condition the modulated signals for transmission and/or condition the received signals prior to demodulation. The example antenna(s) 505 can be implemented by one or more antennas (e.g., wire antenna(s), patch antenna(s), etc.) structured to emit and receive signals conforming to the communication protocol(s) supported by the transmitter 510 and the receiver 515, such as one or more IEEE 802.11 ax-compliant antennas.

The example station 110 of FIG. 5 also includes an example transceiver controller 520 to control operation of the example transmitter 510 and the example receiver 515. Among other things, the transceiver controller 520 controls the example transmitter 510 and the example receiver 515 to operate in different operating modes. For example, the transceiver controller 520 configures the example transmitter 510 and the example receiver 515 in active modes when they are to transmit and receive data, respectively. Otherwise, the transceiver controller 520 of the illustrated example configures the example transmitter 510 and the example receiver 515 in one or more low power modes to conserve power. In some examples, the transceiver controller 520 supports multiple different low power modes in which the example transmitter 510 and/or the example receiver 515 may be configured. For example, the transceiver controller 520 may support a first sleep mode (e.g., a deep sleep mode) in which most or all of the circuitry implementing the example transmitter 510 and the example receiver 515 is powered down or otherwise disabled, and a second sleep mode (e.g., a shallow sleep mode or doze mode) in which just portions (e.g., such as the amplifier portion(s) and/or other substantial power consuming portions) of the circuitry implementing the example transmitter 510 and the example receiver 515 are powered down or otherwise disabled. In some such examples, the first sleep mode (e.g., the deep sleep mode) may achieve more power savings than the second sleep mode (e.g., the shallow sleep mode or doze mode), but it may take longer for the transmitter 510 and/or the receiver 515 to transition from the first sleep mode (e.g., the deep sleep mode) to the active mode than it does to transition from the second sleep mode (e.g., the shallow sleep mode or doze mode) to the active mode.

The example station 110 of FIG. 5 further includes an example uplink processor 525 to detect when the station 110 is ready to transmit uplink data (e.g., by detecting when an uplink data buffer is full, when a timer has expired, etc.). In some examples, when the uplink processor 525 determines that the station 110 is ready to transmit uplink data, the uplink processor 525 invokes the transceiver controller 520 to control the transmitter 510 and the receiver 515 to transition from a sleep mode (e.g., a deep sleep mode) or other lower power operating mode to an active mode. Additionally, the uplink processor 525 of the illustrated example invokes an example poll generator 530 included in the example station of FIG. 5. The example poll generator 530 generates a control frame, such as the example PS-Poll frame 226 or 236 described above, to be transmitted via the transmitter 510 to an AP, such the example AP 105, for uplink resource allocation.

The example station 110 of FIG. 5 includes an example response decoder 535 to decode a response frame, such as the example ACK frame 230 or 240, or the example MU-BA frame 304 described above, received from an AP, such the example AP 105, in response to a control frame, such as the example PS-Poll frame 226 or 236, previously sent to the AP for uplink resource allocation. The example response decoder 535 also accesses the start time field (e.g., the start time field 232, 242, 306 or 308) of the received response to determine the start time of the scheduled trigger frame (e.g., the S-TF 222 or 224) to which the station 110 has been assigned. In the illustrated example of FIG. 5, the uplink processor 525 uses the start time of the scheduled trigger frame obtained from the response decoder 535 to configure a sleep/doze interval (e.g., such as the sleep interval 246 or 248 described above) during which the transceiver controller 520 is to place the transmitter 510 and/or the receiver 515 into a sleep mode (e.g., a shallow sleep mode or doze mode) or other lower power operating mode.

After expiration of the sleep interval configured by the uplink processor 525 as a function of trigger frame start time obtained from the response decoder 535, the transceiver controller 520 wakes the transmitter 510 and the receiver 515 such that the receiver 515 is able to receive the scheduled trigger frame (e.g., the S-TF 222 or 224) at its specified start time. In the illustrated example, the uplink processor 525 processes the information contained in the scheduled trigger frame to select an uplink resource (or resources, such as one or more sub-channels) to be used to transmit uplink data. For example, if the uplink processor 525 detects an identifier, such as an AID, for the station 110 in the received trigger frame, the uplink processor 525 selects the uplink resource(s) that the trigger frame has associated with that identifier. Otherwise, the uplink processor 525 selects the uplink resource(s) from a group of uplink resources which are associated by the trigger frame with a generic or group identifier, or which are indicated as being default resources, etc.

After selecting the uplink resource(s), the uplink processor 525 causes the station 100 to transmit its uplink data during the TXOP window (e.g., the TXOP window 228 or 238) defined by the scheduled trigger frame. Then, after uplink data transmission completes, the uplink processor 525 invokes the transceiver controller 520 to control the transmitter 510 and the receiver 515 to transition to a sleep mode (e.g., a deep sleep mode) or other lower power operating mode until, for example, the uplink processor 525 determines the station 110 is again ready to transmit uplink data.

While example manners of implementing the example communication system 100 are illustrated in FIGS. 1-5, one or more of the elements, processes and/or devices illustrated in FIGS. 1-5 may be combined, divided, re-arranged, omitted, eliminated and/or implemented in any other way. Further, the example AP 105, the example stations 110 and/or 110A-D, the example antenna(s) 405, the example transmitter 410, the example receiver 415, the example uplink scheduler 420, the example response frame generator 425, the example trigger frame generator 430, the example antenna(s) 505, the example transmitter 510, the example receiver 515, the example transceiver controller 520, the example uplink processor 525, the example poll generator 530, the example response decoder 535 and/or, more generally, the example communication system 100 of FIGS. 1-5 may be implemented by hardware, software, firmware and/or any combination of hardware, software and/or firmware. Thus, for example, any of the example AP 105, the example stations 110 and/or 110A-D, the example antenna(s) 405, the example transmitter 410, the example receiver 415, the example uplink scheduler 420, the example response frame generator 425, the example trigger frame generator 430, the example antenna(s) 505, the example transmitter 510, the example receiver 515, the example transceiver controller 520, the example uplink processor 525, the example poll generator 530, the example response decoder 535 and/or, more generally, the example communication system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example communication system 100, the example AP 105, the example stations 110 and/or 110A-D, the example antenna(s) 405, the example transmitter 410, the example receiver 415, the example uplink scheduler 420, the example response frame generator 425, the example trigger frame generator 430, the example antenna(s) 505, the example transmitter 510, the example receiver 515, the example transceiver controller 520, the example uplink processor 525, the example poll generator 530 and/or the example response decoder 535 is/are hereby expressly defined to include a tangible computer readable storage device or storage disk such as a memory, a digital versatile disk (DVD), a compact disk (CD), a Blu-ray disk, etc. storing the software and/or firmware. Further still, the example communication system 100 of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication system 100, the example AP 105, the example stations 110 and/or 110A-D, the example antenna(s) 405, the example transmitter 410, the example receiver 415, the example uplink scheduler 420, the example response frame generator 425, the example trigger frame generator 430, the example antenna(s) 505, the example transmitter 510, the example receiver 515, the example transceiver controller 520, the example uplink processor 525, the example poll generator 530 and/or the example response decoder 535 are shown in FIGS. 6-10. In these examples, the machine readable instructions comprise one or more programs for execution by a processor, such as the processor(s) 1112 and/or 1212 shown in the example processor platforms 1100 and 1200 discussed below in connection with FIGS. 11 and 12, respectively. The one or more programs, or portion(s) thereof, may be embodied in software stored on a tangible computer readable storage medium such as a CD-ROM, a floppy disk, a hard drive, a digital versatile disk (DVD), a Blu-Ray Disk™, or a memory associated with the processor(s) 1112 and/or 1212, but the entire program or programs and/or portions thereof could alternatively be executed by a device other than the processors 1112 and/or 1212, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-10, many other methods of implementing the example communication system 100, the example AP 105, the example stations 110 and/or 110A-D, the example antenna(s) 405, the example transmitter 410, the example receiver 415, the example uplink scheduler 420, the example response frame generator 425, the example trigger frame generator 430, the example antenna(s) 505, the example transmitter 510, the example receiver 515, the example transceiver controller 520, the example uplink processor 525, the example poll generator 530 and/or the example response decoder 535 may alternatively be used. For example, with reference to the flowcharts illustrated in FIGS. 6-10, the order of execution of the blocks may be changed, and/or some of the blocks described may be changed, eliminated, combined and/or subdivided into multiple blocks.

As mentioned above, the example processes of FIGS. 6-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-10 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 600 including machine readable instructions that may be executed to implement one or more of the example stations 110 and/or 110A-D of FIGS. 1 and/or 5 is illustrated in FIG. 5. For convenience, and without loss of generality, execution of the example program 600 is described from the perspective of the example station 110 of FIG. 5 operating in the example communication system 100 of FIG. 1. With reference to the preceding figures and associated written descriptions, the example program 600 of FIG. 6 begins execution at block 605 at which the example uplink processor 525 of the station 110 detects that the station 110 has uplink data ready to be transmitted. At block 610, the uplink processor 525 invokes the example transceiver controller 520 of the station 110 to wake the station's example transmitter 510. At block 610, the uplink processor 525 further invokes the example poll generator 530 of the station 110 to generate and send, via the transmitter 510, a control frame, such as the example PS-Poll frame 226 or 236 described above, to the example AP 105 for uplink resource allocation.

At block 615, the example response decoder 535 of the station 110 receives, via the station's example receiver 515, a response frame, such as the example ACK frame 230 or 240, or the example MU-BA frame 304 described above, from the AP 105 in response to the control frame sent at block 610. At block 620, the response decoder 535 accesses the response frame received at block 615 and obtains the start time specified for the scheduled trigger frame (e.g., the S-TF 222 or 224) to which AP 105 has assigned the station 110. At block 625, the uplink processor 525 uses the start time of the scheduled trigger frame obtained at block 625 to control, via the transceiver controller 520, the station's receiver 515 to receive the scheduled trigger frame (e.g., the S-TF 222 or 224) at the specified start time. An example program that may be used to implement the processing at block 625 is illustrated in FIG. 7, which is described in further detail below.

Figure 8:
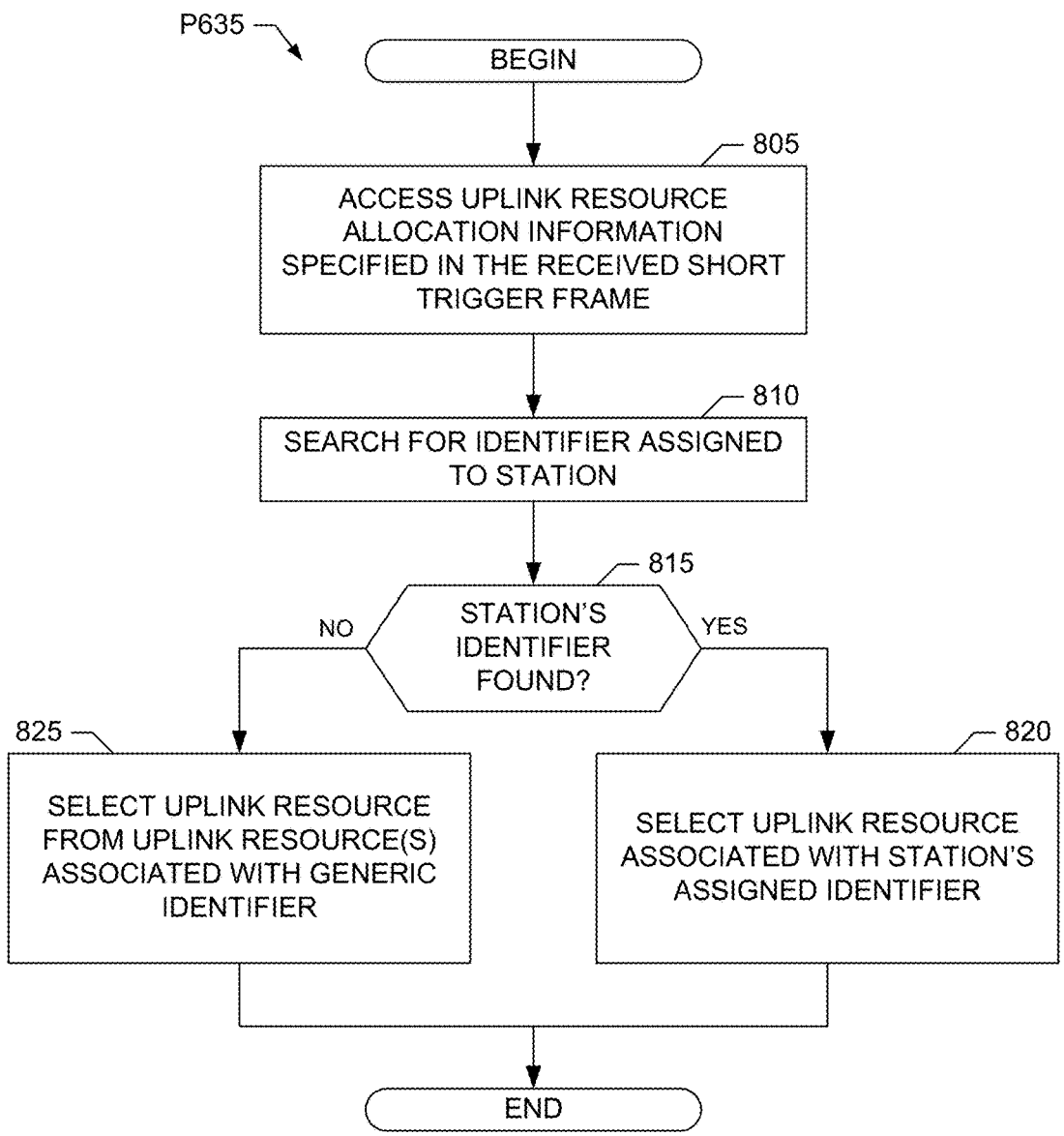

At block 630, the station's receiver 515 receives the scheduled trigger frame (e.g., the S-TF 222 or 224) at the specified start time. At block 635, the uplink processor 525 processes the information conveyed in the scheduled trigger frame received at block 630 to select uplink resource(s) to be used by the station 110 to transmit its uplink data. An example program that may be used to implement the processing at block 635 is illustrated in FIG. 8, which is described in further detail below. At block 640, the uplink processor 525 configures, via the transceiver controller 520, the station's transmitter 510 to transmit uplink data uplink resource(s) selected at block 635. After uplink data transmission completes at block 640, the uplink processor 525 invokes the transceiver controller 520 to control the transmitter 510 and the receiver 515 to transition to a sleep mode (e.g., a deep sleep mode) or other lower power operating mode until, for example, the uplink processor 525 determines the station 110 is again ready to transmit uplink data.

Figure 6:
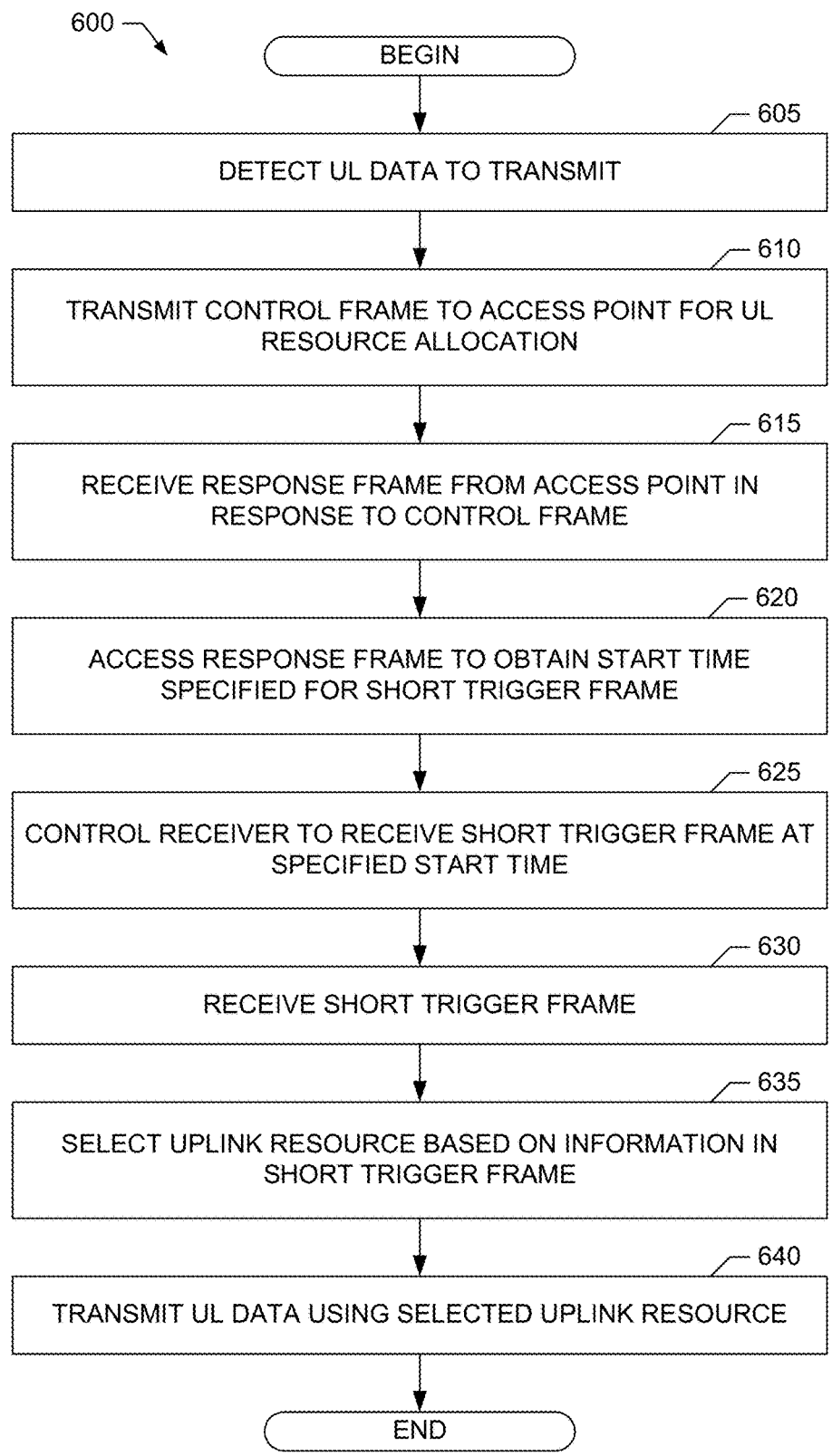
FIGS. 6-8 are flowcharts representative of example machine readable instructions that may be executed to implement the example station of FIG. 5.
Figure 7:
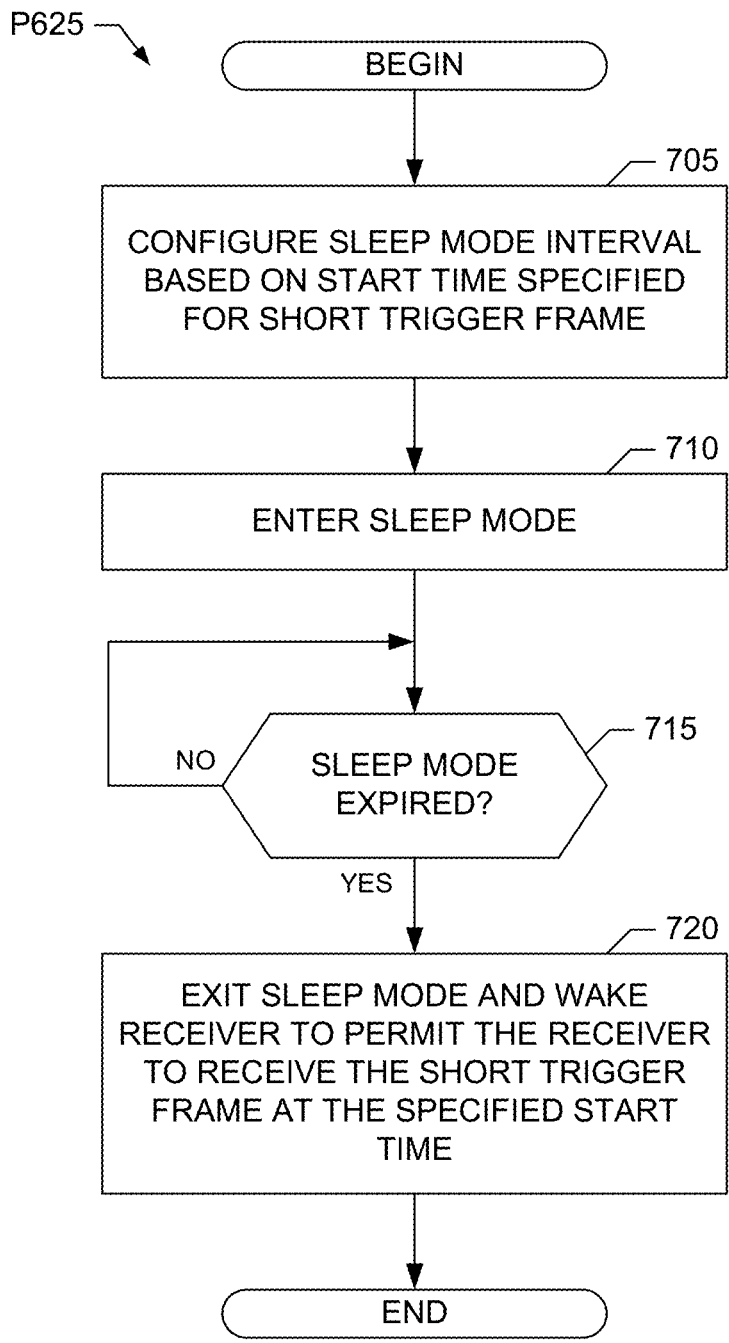

An example program P625 including machine readable instructions that may be executed to implement the processing at block 625 of FIG. 6 is illustrated in FIG. 7. For convenience, and without loss of generality, execution of the example program P625 is described from the perspective of the example station 110 of FIG. 5 operating in the example communication system 100 of FIG. 1. With reference to the preceding figures and associated written descriptions, the example program P625 of FIG. 7 begins execution at block 705 at which the example uplink processor 525 of the station 110 uses the start time of the station's assigned, scheduled trigger frame (e.g., the S-TF 222 or 224), which was specified in a response frame (e.g., the example ACK frame 230 or 240, or the example MU-BA frame 304) previously received from the example AP 105, to configure a sleep/doze interval (e.g., the sleep interval 246 or 248 described above). In some examples, at block 705 the uplink processor 525 sets the sleep/doze interval to be a function of the specified start time of the trigger frame, as described above in connection with the example timing diagram 200 of FIG. 2.

At block 710, the uplink processor 525 invokes the example transceiver controller 520 of the station 110 to place the station's example transmitter 510 and example receiver 515 into a sleep mode (e.g., a shallow sleep mode or doze mode) or other lower power operating mode for the duration of the sleep/doze interval determined at block 705. At block 710, the transceiver controller 520 determines whether the sleep/doze interval has expired. When the sleep/doze interval expires (block 715), at block 720 the transceiver controller 520 wakes the receiver 515 (and possibly the transmitter 510) to permit the receiver 515 to receive the scheduled trigger frame (e.g., the S-TF 222 or 224) at its specified start time.

An example program P635 including machine readable instructions that may be executed to implement the processing at block 635 of FIG. 6 is illustrated in FIG. 8. For convenience, and without loss of generality, execution of the example program P635 is described from the perspective of the example station 110 of FIG. 5 operating in the example communication system 100 of FIG. 1. With reference to the preceding figures and associated written descriptions, the example program P635 of FIG. 8 begins execution at block 805 at which the example uplink processor 525 of the station 110 accesses uplink resource allocation information specified in the scheduled trigger frame (e.g., the S-TF 222 or 224) to which the station 110 was assigned by the example AP 105. At block 810, the uplink processor 525 searches the uplink resource allocation information for an identifier of the station 110 (e.g., such as an AID assigned by the AP 105 to the station 110 during an IEEE 802.11 association procedure). If an identifier of the station 110 is found (block 815), at block 820 the uplink processor 525 selects the uplink resource(s) (e.g., sub-channel(s)) specified in the scheduled trigger frame as being associated with the station's identifier. However, if an identifier of the station 110 is not found (block 815), at block 825 the uplink processor 525 selects (e.g., via a random selection procedure) uplink resource(s) from a group of uplink resources specified in the scheduled trigger frame as being associated with a generic (or group) identifier (or, in some examples, otherwise indicated as being default uplink resources).

Figure 9:
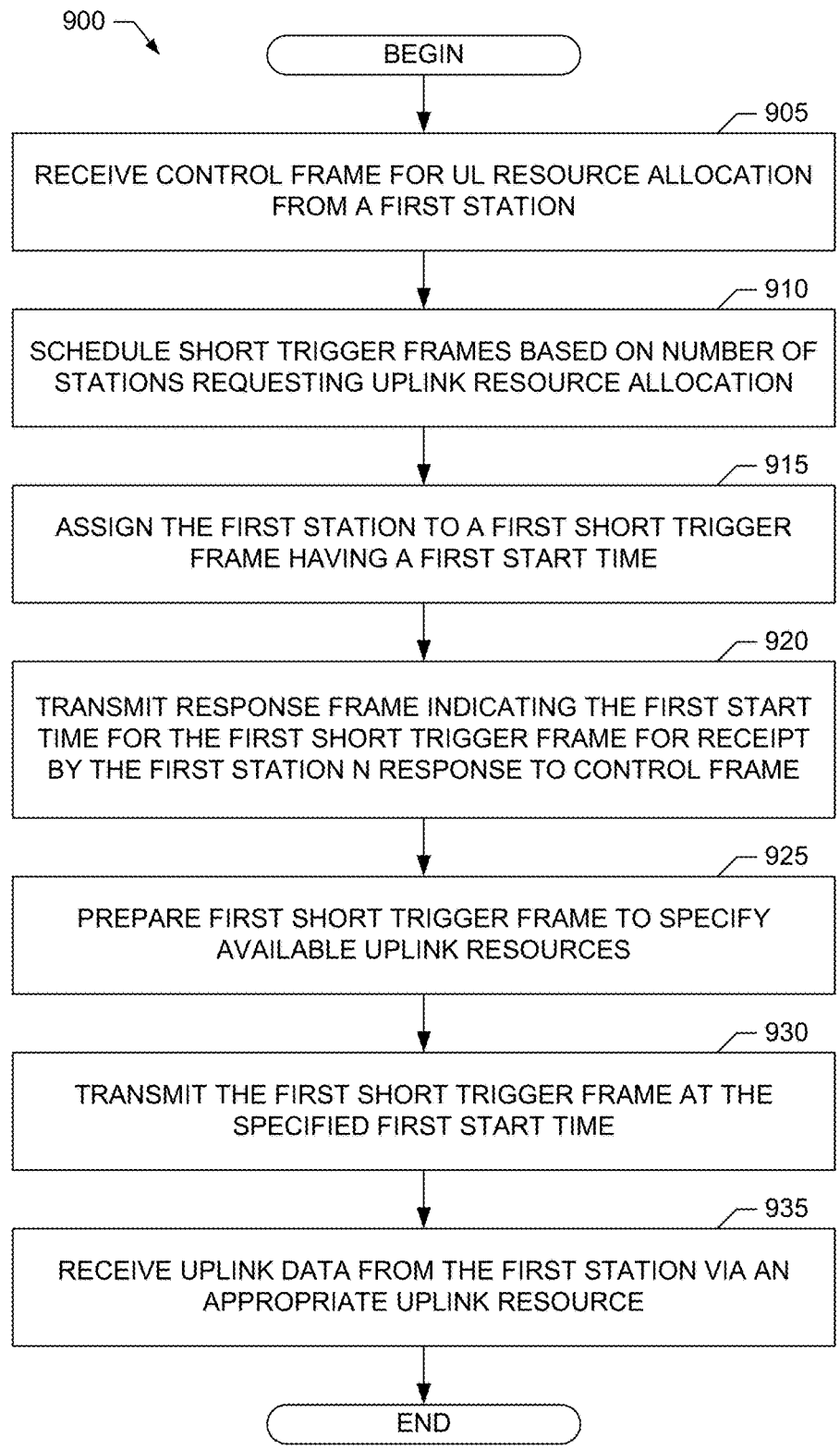
FIGS. 9-10 are flowcharts representative of example machine readable instructions that may be executed to implement the example access point of FIG. 4.

An example program 900 including machine readable instructions that may be executed to implement the example AP 105 of FIGS. 1 and/or 4 is illustrated in FIG. 9. For convenience, and without loss of generality, execution of the example program 900 is described from the perspective of the example AP 105 of FIG. 4 operating in the example communication system 100 of FIG. 1. With reference to the preceding figures and associated written descriptions, the example program 900 of FIG. 9 begins execution at block 905 at which the example uplink scheduler 420 of the AP 105 receives, via the AP's example receiver 415, a control frame (e.g., the example PS-Poll frame 226) for uplink resource allocation from a station, such as the example station 110C. At block 910, the uplink scheduler 420 schedules a number of scheduled trigger frames (e.g., a number of S-TFs) based on a number of control frames (e.g., PS-Poll frames) received from stations during a given period of time (e.g., such as during a given uplink scheduling window). At block 915, the uplink scheduler 420 assigns the station 110C to a particular scheduled trigger frame, such as the S-TF 222.

At block 920, the response frame generator 425 generates a response frame, which indicates the start time of the scheduled trigger frame (e.g., the S-TF 222), and transmits the response frame via the AP's example transmitter 410 to the station 110C, which sent the control frame received at block 905. In some examples, the response frame generated by the response frame generator 425 and transmitted at block 920 is an ACK frame (e.g., the ACK frame 230) including a start time field (e.g., the start time field 232) specifying the start time of the scheduled trigger frame (e.g., the S-TF 222), when the control frame received at block 905 was received as an individual frame. In some examples, the response frame generated by the response frame generator 425 and transmitted at block 920 is an MU-BA frame (e.g., the MU-BA frame 304) including a start time field (e.g., the start time field 306) specifying the start time of the scheduled trigger frame (e.g., the S-TF 222), when the control frame received at block 905 was received in a multi-user format with other control frames received at the same time.

Figure 10:
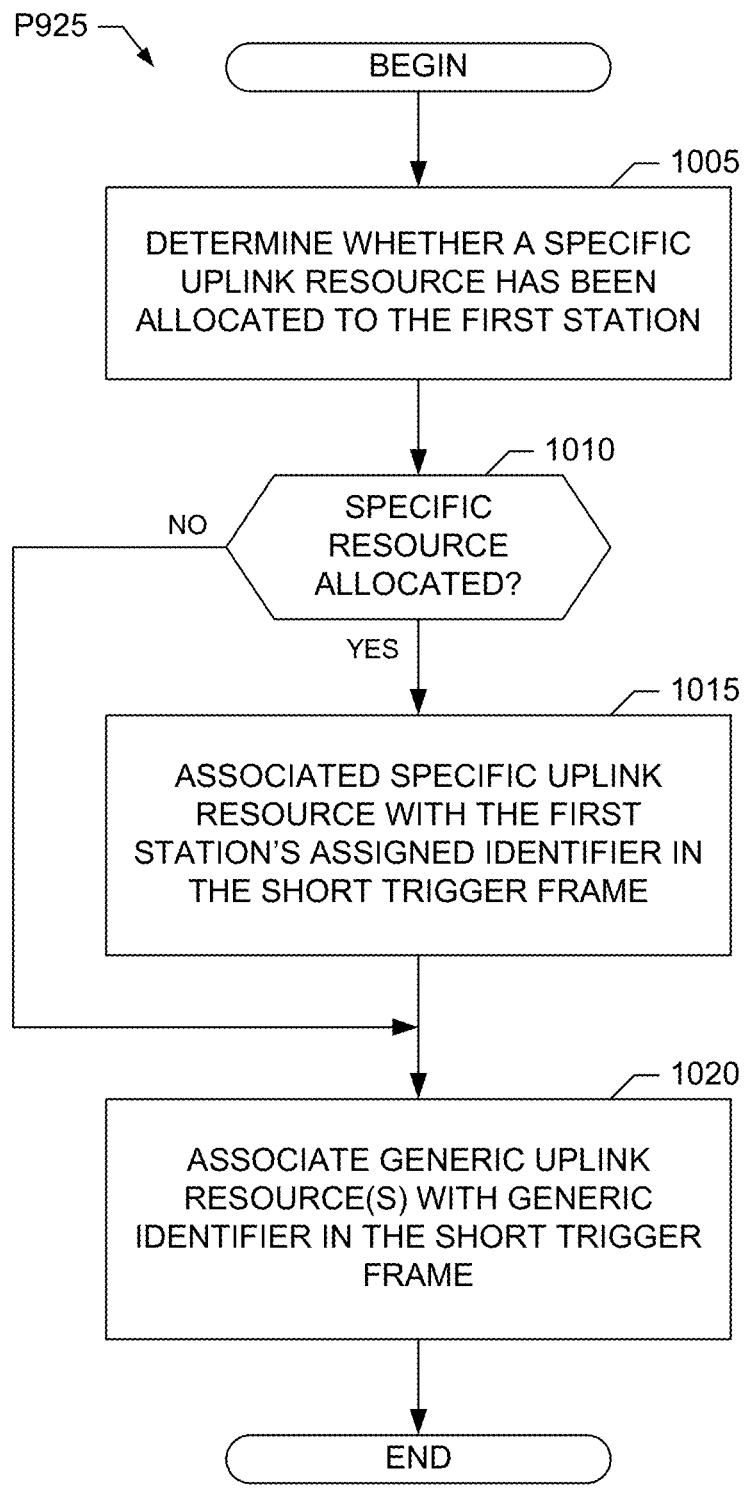

At block 925, the example trigger frame generator 430 generates the scheduled trigger frame (e.g., the S-TF 222) to specify the allocated uplink resources available during the TXOP window defined by the trigger frame. An example program that may be used to implement the processing at block 925 is illustrated in FIG. 10, which is described in further detail below. At block 930, the trigger frame generator 430 transmits, via the AP's transmitter 410, the scheduled trigger frame (e.g., the S-TF 222) at its specified start time. At block 935, the AP 105 receives uplink data (e.g., the uplink data 254) from the station 110C using uplink resource(s) selected based on information provided in the scheduled trigger frame (e.g., the S-TF 222) generated and transmitted at block 925.

An example program P925 including machine readable instructions that may be executed to implement the processing at block 925 of FIG. 9 is illustrated in FIG. 10. For convenience, and without loss of generality, execution of the example program P925 is described from the perspective of the example AP 105 of FIG. 4 operating in the example communication system 100 of FIG. 1. With reference to the preceding figures and associated written descriptions, the example program P925 of FIG. 10 begins execution at block 1005 at which the example trigger frame generator 430 determines whether the example uplink scheduler 420 of the AP 105 allocated specific uplink resource(s) to a station (e.g., the station 110C) that is assigned to the scheduled trigger frame (e.g., the S-TF 222) currently being generated by the trigger frame generator 430. If the uplink scheduler 420 allocated specific uplink resource(s) to the station (block 1010), at block 1015 the trigger frame generator 430 includes an identifier (e.g., an AID) of the station (e.g., the station 110C) in the scheduled trigger frame (e.g., the S-TF 222) being generated, and associates the station's identifier with the uplink resource(s) specified in the scheduled trigger frame as being allocated to that station.

At block 1020, the trigger frame generator 430 accesses information from the uplink scheduler 420 specifying a group of uplink resources allocated by the uplink scheduler 420 for use by a specified group (e.g., any or a subset) of the stations assigned by the uplink scheduler 420 to the scheduled trigger frame being generated. At block 1020, the trigger frame generator 430 specifies this group of uplink resources in the scheduled trigger frame being generated, and associates this group of uplink resources with a generic (or group) ID also included in the scheduled trigger frame, or otherwise indicates that this is a default group of uplink resources available for selection by the specified group of stations.

Figure 11:
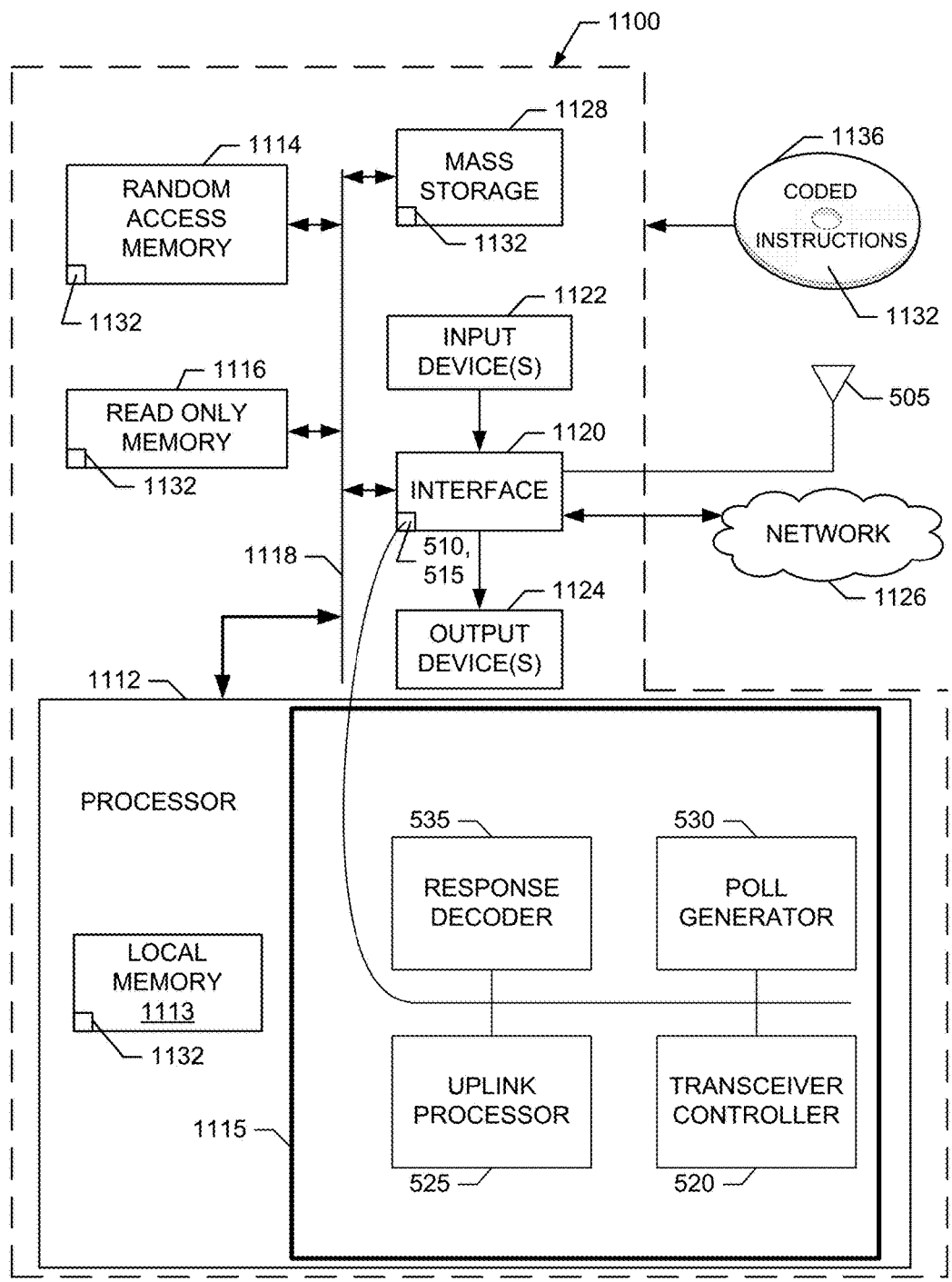
FIG. 11 is a block diagram of an example processor platform structured to execute the example machine readable instructions of FIGS. 6, 7 and/or 8 to implement the example station of FIG. 5.

FIG. 11 is a block diagram of an example processor platform 1100 capable of executing the instructions of FIGS. 6, 7 and/or 8 to implement one or more of the example stations 110 and/or 110A-D of FIGS. 1 and/or 5. The processor platform 1100 can be, for example, a router, a gateway, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 includes one or more example processing cores 1115 configured via example instructions 1132, which include the example instructions of FIGS. 6, 7 and/or 8, to implement the example transceiver controller 520, the example uplink processor 525, the example poll generator 530 and/or the example response decoder 535 of FIG. 5.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). In some examples, the interface circuit 1120 of the illustrated example includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.). In the illustrated example of FIG. 11, the interface circuit 1120 is also structured to interface with the example antenna(s) 505 and implement the example transmitter 510 and/or the example receive 515. As such, the example interface circuit 1120 may include one or more modulators and/or demodulators, such as an OFDM modulator/demodulator, a Wi-Fi modulator/demodulator, etc., to modulate signals for transmission and/or to demodulate received signals. Additionally, the example interface circuit 1120 may include one or more filters, amplifiers, etc., to, for example, condition the modulated signals for transmission and/or condition the received signals prior to demodulation.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID (redundant array of independent disks) systems, and digital versatile disk (DVD) drives.

Coded instructions 1132 corresponding to the example instructions of FIGS. 6, 7 and/or 8 may be stored in the mass storage device 1128, in the volatile memory 1114, in the non-volatile memory 1116, in the local memory 1113 and/or on a removable tangible computer readable storage medium, such as a CD or DVD 1136.

Figure 12:
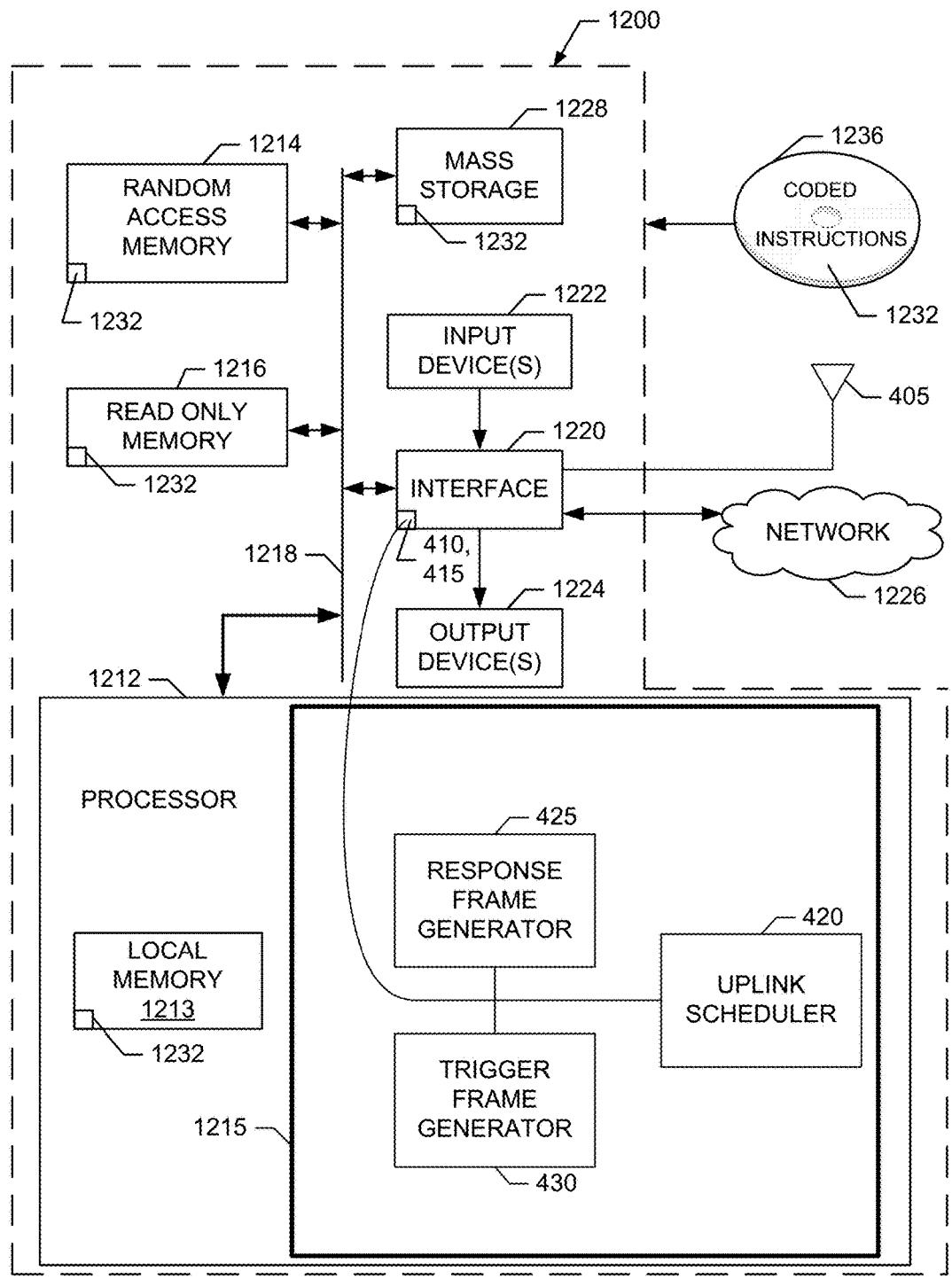
FIG. 12 is a block diagram of an example processor platform structured to execute the example machine readable instructions of FIGS. 9 and/or 10 to implement the example access point of FIG. 4.

FIG. 12 is a block diagram of an example processor platform 1200 capable of executing the instructions of FIGS. 9 and/or 10 to implement the example AP 105 of FIGS. 1 and/or 4. The processor platform 1200 can be, for example, a router, a gateway, a server, a personal computer, a mobile device (e.g., a cell phone, a smart phone, a tablet such as an iPad™), a PDA, an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example of FIG. 12, the processor 1212 includes one or more example processing cores 1215 configured via example instructions 1232, which include the example uplink scheduler 420, the example response frame generator 425 and/or the example trigger frame generator 430 of FIG. 4.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, a liquid crystal display, a CRT, a touchscreen, a tactile output device, a printer and/or speakers). In some examples, the interface circuit 1220 of the illustrated example includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a DSL, a telephone line, coaxial cable, a cellular telephone system, etc.). In the illustrated example of FIG. 12, the interface circuit 1220 is also structured to interface with the example antenna(s) 405 and implement the example transmitter 410 and/or the example receive 415.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives.

Coded instructions 1232 corresponding to the example instructions of FIGS. 9 and/or 10 may be stored in the mass storage device 1228, in the volatile memory 1214, in the non-volatile memory 1216, in the local memory 1213 and/or on a removable tangible computer readable storage medium, such as a CD or DVD 1236.

The following further examples, which include subject matter such as a method to control uplink transmissions in a communication system with scheduled trigger frames, means for controlling uplink transmissions in a communication system with scheduled trigger frames, at least one computer-readable medium including instructions that, when executed by a processor cause the processor to control uplink transmissions in a communication system with scheduled trigger frames, and an apparatus and/or a system to control uplink transmissions in a communication system with scheduled trigger frames, are disclosed herein.

Example 1 is a method for a station in a communication system, which includes accessing a response frame received in response to a control frame transmitted to an access point of the communication system for uplink resource allocation, the response frame indicating a start time for a trigger frame to be transmitted by the access point to trigger the station to transmit an uplink transmission. The method of example 1 also includes controlling a receiver of the station to receive the trigger frame at the start time indicated in the response frame.

Example 2 includes the subject matter of example 1, wherein the communication system corresponds to an Institute of Electrical and Electronics Engineers (IEEE) 802.11ax-compliant wireless local area network (WLAN), and the response frame is not a beacon frame transmitted by the access point.

Example 3 includes the subject matter of example 1, wherein the control frame is a power save poll (PS-Poll) frame transmitted by the station to the access point, and the response frame is an acknowledgment (ACK) frame received by the station from the access point in response to the PS-Poll frame.

Example 4 includes the subject matter of example 1, and further includes causing the station to enter a sleep mode for a first sleep interval beginning after receipt of the response frame and ending prior to the start time indicated in the response frame.

Example 5 includes the subject matter of example 4, wherein controlling the receiver includes waking the receiver after expiration of the first sleep interval to permit the receiver to receive the trigger frame at the start time indicated in the response frame.

Example 6 includes the subject matter of example 1, wherein controlling the receiver includes activating the receiver at the start time indicated in the response frame to receive the trigger frame. The method of example 6 further includes selecting an uplink resource specified in the trigger frame, and transmitting uplink data using the selected uplink resource.

Example 7 includes the subject matter of example 6, wherein the station is associated with a first association identifier (AID) assigned by the access point to the station. In the method of example 7, selecting the uplink resource includes selecting a first uplink resource specified in the trigger frame as being associated with the first AID when the trigger frame includes the first AID, and selecting a second uplink resource from among a group of uplink resources specified in the trigger frame as being associated with a second AID when the trigger frame does not include the first AID.

Example 8 includes the subject matter of example 1, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 9 includes the subject matter of example 8, wherein the MU-BA frame provides the start time for the trigger frame to the first station and the second station.

Example 10 includes the subject matter of example 8, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 11 includes the subject matter of example 1 or example 2, wherein the control frame is a power save poll (PS-Poll) frame transmitted by the station to the access point, and the response frame is an acknowledgment (ACK) frame received by the station from the access point in response to the PS-Poll frame.

Example 12 includes the subject matter of any one of examples 1, 2, or 11, and further includes causing the station to enter a sleep mode for a first sleep interval beginning after receipt of the response frame and ending prior to the start time indicated in the response frame.

Example 13 includes the subject matter of example 12, wherein controlling the receiver includes waking the receiver after expiration of the first sleep interval to permit the receiver to receive the trigger frame at the start time indicated in the response frame.

Example 14 includes the subject matter of any one of examples 1, 2, or 11 to 13, wherein controlling the receiver includes activating the receiver at the start time indicated in the response frame to receive the trigger frame. The method of example 14 further includes selecting an uplink resource specified in the trigger frame, and transmitting uplink data using the selected uplink resource.

Example 15 includes the subject matter of example 14, wherein the station is associated with a first association identifier (AID) assigned by the access point to the station. In the method of example 15, selecting the uplink resource includes selecting a first uplink resource specified in the trigger frame as being associated with the first AID when the trigger frame includes the first AID, and selecting a second uplink resource from among a group of uplink resources specified in the trigger frame as being associated with a second AID when the trigger frame does not include the first AID.

Example 16 includes the subject matter of any one of examples 1, 2, or 11 to 15, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 17 includes the subject matter of example 16, wherein the MU-BA frame provides the start time for the trigger frame to the first station and the second station.

Example 18 includes the subject matter of example 16, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 19 is a tangible computer readable storage medium including computer readable instructions which, when executed, cause a processor of a station to at least access a response frame received in response to a control frame transmitted to an access point of a communication system for uplink resource allocation, the response frame indicating a start time for a trigger frame to be transmitted by the access point to trigger the station to transmit an uplink transmission, and control a receiver of the station to receive the trigger frame at the start time indicated in the response frame.

Example 20 includes the subject matter of example 19, wherein the communication system corresponds to an Institute of Electrical and Electronics Engineers (IEEE) 802.11ax-compliant wireless local area network (WLAN), and the response frame is not a beacon frame transmitted by the access point.

Example 21 includes the subject matter of example 19, wherein the control frame is a power save poll (PS-Poll) frame transmitted by the station to the access point, and the response frame is an acknowledgment (ACK) frame received by the station from the access point in response to the PS-Poll frame.

Example 22 includes the subject matter of example 19, wherein the computer readable instructions, when executed, further cause the processor to cause the station to enter a sleep mode for a first sleep interval beginning after receipt of the response frame and ending prior to the start time indicated in the response frame.

Example 23 includes the subject matter of example 22, wherein to control the receiver, the computer readable instructions, when executed, further cause the processor to wake the receiver after expiration of the first sleep interval to permit the receiver to receive the trigger frame at the start time indicated in the response frame.

Example 24 includes the subject matter of example 19, wherein to control the receiver, the computer readable instructions, when executed, further cause the processor to activate the receiver at the start time indicated in the response frame to receive the trigger frame. In example 24, the instructions, when executed, further cause the processor to select an uplink resource specified in the trigger frame, and transmit uplink data using the selected uplink resource.

Example 25 includes the subject matter of example 24, wherein the station is associated with a first association identifier (AID) assigned by the access point to the station. In example 25, to select the uplink resource, the computer readable instructions, when executed, further cause the processor to select a first uplink resource specified in the trigger frame as being associated with the first AID when the trigger frame includes the first AID, and select a second uplink resource from among a group of uplink resources specified in the trigger frame as being associated with a second AID when the trigger frame does not include the first AID.

Example 26 includes the subject matter of example 19, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 27 includes the subject matter of example 26, wherein the MU-BA frame provides the start time for the trigger frame to the first station and the second station.

Example 28 includes the subject matter of example 26, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 29 includes the subject matter of example 19 or example 22, wherein to control the receiver, the computer readable instructions, when executed, further cause the processor to activate the receiver at the start time indicated in the response frame to receive the trigger frame. In example 29, the instructions, when executed, further cause the processor to select an uplink resource specified in the trigger frame, and transmit uplink data using the selected uplink resource.

Example 30 includes the subject matter of example 29, wherein the station is associated with a first association identifier (AID) assigned by the access point to the station. In example 30, to select the uplink resource, the computer readable instructions, when executed, further cause the processor to select a first uplink resource specified in the trigger frame as being associated with the first AID when the trigger frame includes the first AID, and select a second uplink resource from among a group of uplink resources specified in the trigger frame as being associated with a second AID when the trigger frame does not include the first AID.

Example 31 includes the subject matter of any one of examples 19, 22, 29 or 30, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 32 is a tangible computer readable storage medium including computer readable instructions which, when executed, cause a processor to perform a method as defined in any one of examples 1 to 18.

Example 33 is a station including a decoder to access a response frame received in response to a control frame transmitted to an access point of a communication system for uplink resource allocation, the response frame indicating a start time for a trigger frame to be transmitted by the access point to trigger the station to transmit an uplink transmission. The station of example 33 also includes a receiver to receive the response frame. The station of example 33 further includes a controller to control the receiver to receive the trigger frame at the start time indicated in the response frame.

Example 34 includes the subject matter of example 33, wherein the communication system corresponds to an Institute of Electrical and Electronics Engineers (IEEE) 802.11ax-compliant wireless local area network (WLAN), and the response frame is not a beacon frame transmitted by the access point.

Example 35 includes the subject matter of example 33, wherein the control frame is a power save poll (PS-Poll) frame transmitted by the station to the access point, and the response frame is an acknowledgment (ACK) frame received by the station from the access point in response to the PS-Poll frame.

Example 36 includes the subject matter of example 33, wherein the controller is to cause the station to enter a sleep mode for a first sleep interval beginning after receipt of the response frame and ending prior to the start time indicated in the response frame.

Example 37 includes the subject matter of example 36, wherein the controller is further to wake the receiver after expiration of the first sleep interval to permit the receiver to receive the trigger frame at the start time indicated in the response frame.

Example 38 includes the subject matter of example 33, wherein the controller is further to activate the receiver at the start time indicated in the response frame to receive the trigger frame. The station of example 38 further includes an uplink processor to select an uplink resource specified in the trigger frame, and a transmitter to transmit uplink data using the selected uplink resource.

Example 39 includes the subject matter of example 38, wherein the station is associated with a first association identifier (AID) assigned by the access point to the station. In example 39, the uplink processor is further to select a first uplink resource specified in the trigger frame as being associated with the first AID when the trigger frame includes the first AID, and select a second uplink resource from among a group of uplink resources specified in the trigger frame as being associated with a second AID when the trigger frame does not include the first AID.

Example 40 includes the subject matter of example 33, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 41 includes the subject matter of example 40, wherein the MU-BA frame provides the start time for the trigger frame to the first station and the second station.

Example 42 includes the subject matter of example 40, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 43 includes the subject matter of example 33 or example 36, wherein the controller is further to activate the receiver at the start time indicated in the response frame to receive the trigger frame. The station of example 43 further includes an uplink processor to select an uplink resource specified in the trigger frame, and a transmitter to transmit uplink data using the selected uplink resource.

Example 44 includes the subject matter of example 43, wherein the station is associated with a first association identifier (AID) assigned by the access point to the station. In example 44, the uplink processor is further to select a first uplink resource specified in the trigger frame as being associated with the first AID when the trigger frame includes the first AID, and select a second uplink resource from among a group of uplink resources specified in the trigger frame as being associated with a second AID when the trigger frame does not include the first AID.

Example 45 includes the subject matter of any one of examples 33, 36, 43 or 44, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 46 is a station including a processor configured to perform a method as defined in any one of examples 1 to 18.

Example 47 is an apparatus including means for accessing a response frame received at a station in response to a control frame transmitted to an access point of a communication system for uplink resource allocation, the response frame indicating a start time for a trigger frame to be transmitted by the access point to trigger the station to transmit an uplink transmission. The apparatus of example 47 also includes means for controlling a receiver of the station to receive the trigger frame at the start time indicated in the response frame.

Example 48 includes the subject matter of example 47, wherein the communication system corresponds to an Institute of Electrical and Electronics Engineers (IEEE) 802.11ax-compliant wireless local area network (WLAN), and the response frame is not a beacon frame transmitted by the access point.

Example 49 includes the subject matter of example 47, wherein the control frame is a power save poll (PS-Poll) frame transmitted by the station to the access point, and the response frame is an acknowledgment (ACK) frame received by the station from the access point in response to the PS-Poll frame.

Example 50 includes the subject matter of example 47, and further includes means for causing the station to enter a sleep mode for a first sleep interval beginning after receipt of the response frame and ending prior to the start time indicated in the response frame.

Example 51 includes the subject matter of example 50, wherein the means for controlling the receiver include means for waking the receiver after expiration of the first sleep interval to permit the receiver to receive the trigger frame at the start time indicated in the response frame.

Example 52 includes the subject matter of example 47, wherein the means for controlling the receiver includes means for activating the receiver at the start time indicated in the response frame to receive the trigger frame. The apparatus of example 52 further includes means for selecting an uplink resource specified in the trigger frame, and means for transmitting uplink data using the selected uplink resource.

Example 53 includes the subject matter of example 52, wherein the station is associated with a first association identifier (AID) assigned by the access point to the station. In example 53, the means for selecting the uplink resource includes means for selecting a first uplink resource specified in the trigger frame as being associated with the first AID when the trigger frame includes the first AID, and means for selecting a second uplink resource from among a group of uplink resources specified in the trigger frame as being associated with a second AID when the trigger frame does not include the first AID.

Example 54 includes the subject matter of example 47, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 55 includes the subject matter of example 54, wherein the MU-BA frame provides the start time for the trigger frame to the first station and the second station.

Example 56 includes the subject matter of example 54, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 57 includes the subject matter of example 47 or example 50, wherein the means for controlling the receiver includes means for activating the receiver at the start time indicated in the response frame to receive the trigger frame. The apparatus of example 57 further includes means for selecting an uplink resource specified in the trigger frame, and means for transmitting uplink data using the selected uplink resource.

Example 58 includes the subject matter of example 57, wherein the station is associated with a first association identifier (AID) assigned by the access point to the station. In example 58, the means for selecting the uplink resource includes means for selecting a first uplink resource specified in the trigger frame as being associated with the first AID when the trigger frame includes the first AID, and means for selecting a second uplink resource from among a group of uplink resources specified in the trigger frame as being associated with a second AID when the trigger frame does not include the first AID.

Example 59 includes the subject matter of any one of examples 47, 50, 57 or 58, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 60 is a method for an access point in a communication system, which includes transmitting, with a transmitter, a response frame to a station in response to a control frame for uplink resource allocation received from the station, the response frame indicating a start time for a trigger frame to be transmitted by the access point to trigger the station to transmit an uplink transmission. The method of example 60 also includes transmitting, with the transmitter, the trigger frame at the start time indicated in the response frame.

Example 61 includes the subject matter of example 60, wherein the communication system corresponds to an Institute of Electrical and Electronics Engineers (IEEE) 802.11ax-compliant wireless local area network (WLAN), and the response frame is not a beacon frame transmitted by the access point.

Example 62 includes the subject matter of example 60, wherein the control frame is a power save poll (PS-Poll) frame received from the station, and the response frame is an acknowledgment (ACK) frame transmitted to the station in response to the PS-Poll frame.

Example 63 includes the subject matter of example 60, wherein the trigger frame is a first trigger frame of a plurality of trigger frames scheduled by the access point based on a number of stations requesting allocation of uplink resources. The method of example 63 further includes assigning the station to the first trigger frame.

Example 64 includes the subject matter of example 60, and further includes, after transmitting the trigger frame, receiving uplink data from the station via an uplink resource specified in the trigger frame.

Example 65 includes the subject matter of example 64, wherein the station is associated with a first association identifier (AID) assigned to the station, and the uplink resource is specified in the trigger frame as being associated with the first AID.

Example 66 includes the subject matter of example 64, wherein the response frame includes a first AID assigned to the station, and the uplink resource is one of a group of uplink resources specified in the trigger frame as being associated with a second AID when the trigger frame does not include the first AID.

Example 67 includes the subject matter of example 60, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 68 includes the subject matter of example 67, wherein the MU-BA frame provides the start time for the trigger frame to the first station and the second station.

Example 69 includes the subject matter of example 67, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 70 is a tangible computer readable storage medium including computer readable instructions which, when executed by a processor of an access point, cause the access point to at least transmit a response frame to a station in response to a control frame for uplink resource allocation received from the station, the response frame indicating a start time for a trigger frame to be transmitted by the access point to trigger the station to transmit an uplink transmission, and transmit the trigger frame at the start time indicated in the response frame.

Example 71 includes the subject matter of example 70, wherein the access point implements an Institute of Electrical and Electronics Engineers (IEEE) 802.11ax-compliant wireless local area network (WLAN), and the response frame is not a beacon frame transmitted by the access point.

Example 72 includes the subject matter of example 70, wherein the control frame is a power save poll (PS-Poll) frame received from the station, and the response frame is an acknowledgment (ACK) frame transmitted to the station in response to the PS-Poll frame.

Example 73 includes the subject matter of example 70, wherein the trigger frame is a first trigger frame of a plurality of trigger frames scheduled by the access point based on a number of stations requesting allocation of uplink resources. In example 73, the instructions, when executed, further cause the processor to assign the station to the first trigger frame.

Example 74 includes the subject matter of example 70, wherein the instructions, when executed by the processor, further cause the access point to receive uplink data from the station via an uplink resource specified in the trigger frame.

Example 75 includes the subject matter of example 74, wherein the station is associated with a first association identifier (AID) assigned to the station, and the uplink resource is specified in the trigger frame as being associated with the first AID.

Example 76 includes the subject matter of example 74, wherein the station is associated with a first AID assigned to the station, and the uplink resource is one of a group of uplink resources specified in the trigger frame as being associated with a second AID when the trigger frame does not include the first AID.

Example 77 includes the subject matter of example 70, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 78 includes the subject matter of example 77, wherein the MU-BA frame assigns the first station and the second station to the trigger frame.

Example 79 includes the subject matter of example 77, wherein the trigger frame is a first trigger frame, the start time is a first start time, the MU-BA frame assigns the first station to the first trigger frame, and the MU-BA frame assigns the second station to a second trigger frame having a second start time different from the first start time.

Example 80 is a tangible computer readable storage medium including computer readable instructions which, when executed, cause a processor to perform a method as defined in any one of examples 60 to 69.

Example 81 is an access point including a transmitter and a response frame generator to generate a response frame for transmission by the transmitter to a station in response to a control frame for uplink resource allocation received from the station, the response frame indicating a start time for a trigger frame to be transmitted by the access point to trigger the station to transmit an uplink transmission. The access point of example 81 also includes a trigger frame generator to generate the trigger frame for transmission by the transmitter at the start time indicated in the response frame.

Example 82 includes the subject matter of example 81, wherein the access point implements an Institute of Electrical and Electronics Engineers (IEEE) 802.11ax-compliant wireless local area network (WLAN), and the response frame is not a beacon frame transmitted by the access point.

Example 83 includes the subject matter of example 81, wherein the control frame is a power save poll (PS-Poll)

frame received from the station, and the response frame is an acknowledgment (ACK) frame transmitted to the station in response to the PS-Poll frame.

Example 84 includes the subject matter of example 81, wherein the trigger frame is a first trigger frame of a plurality of trigger frames scheduled by the access point based on a number of stations requesting allocation of uplink resources. The access point of example 84 further includes a scheduler to assign the station to the first trigger frame.

Example 85 includes the subject matter of example 81, and further includes a receiver to receive uplink data from the station via an uplink resource specified in the trigger frame.

Example 86 includes the subject matter of example 85, wherein the station is associated with a first association identifier (AID) assigned to the station, and the uplink resource is specified in the trigger frame as being associated with the first AID.

Example 87 includes the subject matter of example 85, wherein the station is associated with a first AID assigned to the station, and the uplink resource is one of a group of uplink resources specified in the trigger frame as being associated with a second AID when the trigger frame does not include the first AID.

Example 88 includes the subject matter of example 81, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 89 includes the subject matter of example 88, wherein the MU-BA frame provides the start time for the trigger frame to the first station and the second station.

Example 90 includes the subject matter of example 88, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Example 91 is an access point including a processor configured to perform a method as defined in any one of examples 60 to 69.

Example 92 is an apparatus including means for transmitting a response frame from an access point to a station in response to a control frame for uplink resource allocation received from the station, the response frame indicating a start time for a trigger frame to be transmitted by the access point to trigger the station to transmit an uplink transmission. The apparatus of example 92 also includes means for transmitting the trigger frame at the start time indicated in the response frame.

Example 93 includes the subject matter of example 92, wherein the access point implements an Institute of Electrical and Electronics Engineers (IEEE) 802.11ax-compliant wireless local area network (WLAN), and the response frame is not a beacon frame transmitted by the access point.

Example 94 includes the subject matter of example 92, wherein the control frame is a power save poll (PS-Poll) frame received from the station, and the response frame is an acknowledgment (ACK) frame transmitted to the station in response to the PS-Poll frame.

Example 95 includes the subject matter of example 92, wherein the trigger frame is a first trigger frame of a plurality of trigger frames scheduled by the access point based on a number of stations requesting allocation of uplink resources. The apparatus of example 95 further includes means for assigning the station to the first trigger frame.

Example 96 includes the subject matter of example 92, and further includes means for receiving uplink data from the station via an uplink resource specified in the trigger frame.

Example 97 includes the subject matter of example 96, wherein the station is associated with a first association identifier (AID) assigned to the station, and the uplink resource is specified in the trigger frame as being associated with the first AID.

Example 98 includes the subject matter of example 96, wherein the response frame includes a first AID assigned to the station, and the uplink resource is one of a group of uplink resources specified in the trigger frame as being associated with a second AID when the trigger frame does not include the first AID.

Example 99 includes the subject matter of example 92, wherein the station is a first station, the control frame is a first control frame, and the response frame is a multi-user block acknowledgment (MU-BA) frame responsive to the first control frame and a second control frame received by the access point from a second station during receipt of the first control frame from the first station.

Example 100 includes the subject matter of example 99, wherein the MU-BA frame provides the start time for the trigger frame to the first station and the second station.

Example 101 includes the subject matter of example 99, wherein the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for a station in a communication system, the method comprising:
   accessing a response frame received in response to a control frame transmitted to an access point of the communication system for uplink resource allocation, the response frame indicating a start time for a trigger frame to be transmitted by the access point to trigger the station to transmit an uplink transmission; and
   controlling a receiver of the station to receive the trigger frame at the start time indicated in the response frame, wherein controlling the receiver includes activating the receiver at the start time indicated in the response frame to receive the trigger frame, and further including:
   selecting an uplink resource specified in the trigger frame; and
   transmitting uplink data using the selected uplink resource, wherein the station is associated with a first association identifier (AID) assigned by the access point to the station, and selecting the uplink resource includes:
   selecting a first uplink resource specified in the trigger frame as being associated with the first AID when the trigger frame includes the first AID; and
   selecting a second uplink resource from among a group of uplink resources specified in the trigger frame as being associated with a second AID when the trigger frame does not include the first AID.

2. The method as defined in claim 1, wherein the communication system corresponds to an Institute of Electrical and Electronics Engineers (IEEE) 802.11ax-compliant wireless local area network (WLAN), and the response frame is not a beacon frame transmitted by the access point.

3. The method as defined in claim 1, wherein the control frame is a power save poll (PS-Poll) frame transmitted by the station to the access point, and the response frame is an acknowledgment (ACK) frame received by the station from the access point in response to the PS-Poll frame.

4. The method as defined in claim 1, further including causing the station to enter a sleep mode for a first sleep interval beginning after receipt of the response frame and ending prior to the start time indicated in the response frame.

5. The method as defined in claim 4, wherein controlling the receiver includes waking the receiver after expiration of the first sleep interval to permit the receiver to receive the trigger frame at the start time indicated in the response frame.

6. The method as defined in claim 1, wherein the station is a first station, the control frame is a first control frame, and the response frame is a multi-user block acknowledgment (MU-BA) frame responsive to the first control frame and a second control frame received by the access point from a second station during receipt of the first control frame from the first station.

7. A method for a station in a communication system, the method comprising:
    accessing a response frame received in response to a control frame transmitted to an access point of the communication system for uplink resource allocation, the response frame indicating a start time for a trigger frame to be transmitted by the access point to trigger the station to transmit an uplink transmission; and
    controlling a receiver of the station to receive the trigger frame at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, and the MU-BA frame provides the start time for the trigger frame to the first station and the second station.

8. A method for a station in a communication system, the method comprising:
    accessing a response frame received in response to a control frame transmitted to an access point of the communication system for uplink resource allocation, the response frame indicating a start time for a trigger frame to be transmitted by the access point to trigger the station to transmit an uplink transmission; and
    controlling a receiver of the station to receive the trigger frame at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

9. A tangible computer readable storage medium comprising computer readable instructions which, when executed, cause a processor of a station to at least:
    access a response frame received in response to a control frame transmitted to an access point of a communication system for uplink resource allocation, the response frame indicating a start time for a trigger frame to be transmitted by the access point to trigger the station to transmit an uplink transmission;
    control a receiver of the station to receive the trigger frame at the start time indicated in the response frame by activating the receiver at the start time indicated in the response frame to receive the trigger frame;
    select an uplink resource specified in the trigger frame; and
    transmit uplink data using the selected uplink resource, wherein the station is associated with a first association identifier (AID) assigned by the access point to the station, and to select the uplink resource, the computer readable instructions, when executed, further cause the processor to:
    select a first uplink resource specified in the trigger frame as being associated with the first AID when the trigger frame includes the first AID; and
    select a second uplink resource from among a group of uplink resources specified in the trigger frame as being associated with a second AID when the trigger frame does not include the first AID.

10. The storage medium as defined in claim 9, wherein the computer readable instructions, when executed, further cause the processor to cause the station to enter a sleep mode for a first sleep interval beginning after receipt of the response frame and ending prior to the start time indicated in the response frame.

11. The storage medium as defined in claim 9, wherein the station is a first station, the control frame is a first control frame, and the response frame is a multi-user block acknowledgment (MU-BA) frame responsive to the first control frame and a second control frame received by the access point from a second station during receipt of the first control frame from the first station.

12. A station comprising:
    a decoder to access a response frame received in response to a control frame transmitted to an access point of a communication system for uplink resource allocation, the response frame indicating a start time for a trigger frame to be transmitted by the access point to trigger the station to transmit an uplink transmission;
    a receiver to receive the response frame; and
    a controller to control the receiver to receive the trigger frame at the start time indicated in the response frame, wherein the controller is further to activate the receiver at the start time indicated in the response frame to receive the trigger frame, and further including:
    an uplink processor to select an uplink resource specified in the trigger frame; and
    a transmitter to transmit uplink data using the selected uplink resource, wherein the station is associated with a first association identifier (AID) assigned by the access point to the station, and the uplink processor is further to:
    select a first uplink resource specified in the trigger frame as being associated with the first AID when the trigger frame includes the first AID; and select a second uplink resource from among a group of uplink resources specified in the trigger frame as being associated with a second AID when the trigger frame does not include the first AID.

13. The station as defined in claim 12, wherein the controller is to cause the station to enter a sleep mode for a first sleep interval beginning after receipt of the response frame and ending prior to the start time indicated in the response frame.

14. The station as defined in claim 12, wherein the station is a first station, the control frame is a first control frame, and the response frame is a multi-user block acknowledgment (MU-BA) frame responsive to the first control frame and a second control frame received by the access point from a second station during receipt of the first control frame from the first station.

15. An access point comprising:
   a transmitter;
   a response frame generator to generate a response frame for transmission by the transmitter to a station in response to a control frame for uplink resource allocation received from the station, the response frame indicating a start time for a trigger frame to be transmitted by the access point to trigger the station to transmit an uplink transmission; and
   a trigger frame generator to generate the trigger frame for transmission by the transmitter at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, and the MU-BA frame provides the start time for the trigger frame to the first station and the second station.

16. The access point as defined in claim 15, wherein the trigger frame is a first trigger frame of a plurality of trigger frames scheduled by the access point based on a number of stations requesting allocation of uplink resources, and further including a scheduler to assign the first station to the first trigger frame.

17. An access point comprising:
   a transmitter;
   a response frame generator to generate a response frame for transmission by the transmitter to a station in response to a control frame for uplink resource allocation received from the station, the response frame indicating a start time for a trigger frame to be transmitted by the access point to trigger the station to transmit an uplink transmission; and
   a trigger frame generator to generate the trigger frame for transmission by the transmitter at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, the trigger frame is a first trigger frame, the start time is a first start time different from a second start time for a second trigger frame, the MU-BA frame provides the first start time for the first trigger frame to the first station to the first trigger frame, and the MU-BA frame provides the second start time for the second trigger frame to the second station.

18. A tangible computer readable storage medium comprising computer readable instructions which, when executed, cause a processor of a station to at least:
   access a response frame received in response to a control frame transmitted to an access point of a communication system for uplink resource allocation, the response frame indicating a start time for a trigger frame to be transmitted by the access point to trigger the station to transmit an uplink transmission; and
   control a receiver of the station to receive the trigger frame at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, and at least one of:
      the MU-BA frame provides the start time for the trigger frame to the first station and the second station; or
      the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

19. A station comprising:
   a decoder to access a response frame received in response to a control frame transmitted to an access point of a communication system for uplink resource allocation, the response frame indicating a start time for a trigger frame to be transmitted by the access point to trigger the station to transmit an uplink transmission;
   a receiver to receive the response frame; and
   a controller to control the receiver to receive the trigger frame at the start time indicated in the response frame, wherein the station is a first station, the control frame is a first control frame, the response frame is a multi-user block acknowledgment (MU-BA) frame responsive to the first control frame and a second control frame received by the access point from a second station during receipt of the first control frame from the first station, and at least one of:
      the MU-BA frame provides the start time for the trigger frame to the first station and the second station; or
      the trigger frame is a first trigger frame, the start time is a first start time different from a second start time for a second trigger frame, the MU-BA frame provides the first start time for the first trigger frame to the first station, and the MU-BA frame provides the second start time for the second trigger frame to the second station.

* * * * *